US012416195B1

(12) United States Patent
Salvoni

(10) Patent No.: US 12,416,195 B1
(45) **Date of Patent: *Sep. 16, 2025**

(54) FRAME ASSEMBLY FOR WINDOWS AND SLIDING DOORS

(71) Applicant: Bruno Salvoni, Doral, FL (US)

(72) Inventor: Bruno Salvoni, Doral, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/746,407

(22) Filed: Jun. 18, 2024

Related U.S. Application Data

(63) Continuation of application No. 17/845,899, filed on Jun. 21, 2022, now Pat. No. 12,012,799, which is a continuation of application No. 17/158,608, filed on Jan. 26, 2021, now Pat. No. 11,365,582, which is a continuation-in-part of application No. 16/654,871, filed on Oct. 16, 2019, now Pat. No. 10,900,273, which is a continuation-in-part of application No. 15/648,666, filed on Jul. 13, 2017, now abandoned.

(51) Int. Cl.

| | |
|---|---|
| ***E06B 3/26*** | (2006.01) |
| ***E05D 15/06*** | (2006.01) |
| ***E06B 1/52*** | (2006.01) |
| ***E06B 1/70*** | (2006.01) |
| ***E06B 3/30*** | (2006.01) |
| ***E06B 3/46*** | (2006.01) |

(52) U.S. Cl.
CPC ............ *E06B 3/30* (2013.01); *E05D 15/0665* (2013.01); *E05D 15/0686* (2013.01); *E06B 1/52* (2013.01); *E06B 1/70* (2013.01); *E06B 3/26* (2013.01); *E06B 3/4636* (2013.01); *E05D 15/0691* (2013.01)

(58) Field of Classification Search
CPC .......... E06B 1/702; E06B 3/26; E06B 3/4609; E06B 3/4636; E06B 1/342
USPC .......................................... 52/221, 583.1, 698
See application file for complete search history.

(56) References Cited

U.S. PATENT DOCUMENTS 3,334,375 A 8/1967 Hubbard
3,896,589 A * 7/1975 Mitchell ............. E06B 3/66319 49/504
4,003,102 A 1/1977 Hawks
4,055,917 A 11/1977 Coller
4,351,131 A * 9/1982 Kubik ........................ E06B 3/42 49/504

(Continued)

*Primary Examiner* — James J Buckle, Jr.
(74) *Attorney, Agent, or Firm* — MALLOY & MALLOY, PL

(57) ABSTRACT

A frame assembly, for use in window and door applications configured to retain a panel, comprising a frame with a cover assembly and a support assembly having a track assembly, and a sill assembly and a header assembly both interconnected to a securing surface. The cover assembly is interconnected to the support assembly. The sill assembly comprises a roller member disposed in supporting relation to the track assembly, and the header assembly is disposed in supporting relation to the support assembly so that the frame is movable relative to both the header assembly and the sill assembly. At least a portion of the frame comprises a predetermined thickness and a predetermined width. The predetermined thickness is substantially less than the predetermined width so that both cooperatively and concurrently enhance viewing through the panel and the frame's stability.

19 Claims, 20 Drawing Sheets

(56) References Cited

U.S. PATENT DOCUMENTS 4,443,984 A * 4/1984 Rasmussen ............... E06B 1/34 52/211
D327,527 S 6/1992 Walker, Jr. et al.
5,465,537 A 11/1995 Fullwood
5,560,149 A * 10/1996 Lafevre ..................... E06B 3/56 49/404
5,596,851 A * 1/1997 Ting .......................... E06B 7/14 52/211
5,622,017 A * 4/1997 Lynn ................. B29C 66/72523 52/204.5
5,653,073 A * 8/1997 Palmer ...................... E06B 3/64 52/204.593
5,791,104 A * 8/1998 Baier ...................... E06B 1/342 49/505
5,941,033 A * 8/1999 Adams ...................... E06B 1/30 52/211
6,055,782 A * 5/2000 Morton ..................... E06B 3/44 49/504
6,098,343 A 8/2000 Brown et al.
6,158,182 A * 12/2000 Biebuyck .................. E04B 2/96 52/235
6,182,405 B1 * 2/2001 Lindahl ................... E06B 1/003 52/204.2
6,487,753 B1 12/2002 Lonnberg
D486,919 S 2/2004 Legay et al.
6,715,248 B2 * 4/2004 Biebuyck .................. E04B 2/96 52/235
6,786,021 B1 9/2004 Chen
6,792,651 B2 9/2004 Weiland et al.
6,807,778 B2 * 10/2004 Engebretson ........... E06B 1/345 52/204.59
D508,741 S 8/2005 Mitrevics
D513,806 S 1/2006 Mitrevics
6,993,873 B2 * 2/2006 Biebuyck .................. E04B 2/96 52/844
7,665,941 B2 * 2/2010 Wolf ....................... E04C 5/161 411/429
D612,517 S 3/2010 Nicholson
D612,951 S 3/2010 Piano
D621,073 S 8/2010 Bergmann
7,941,982 B2 * 5/2011 Merica ...................... E04B 2/90 52/220.8
8,024,898 B2 * 9/2011 Alvarado .................. E06B 1/02 52/204.5
D665,516 S 8/2012 Bergmann
8,443,554 B1 5/2013 Teodorovich
8,584,410 B2 * 11/2013 Furgerson ................. E06B 1/02 49/504
8,601,751 B2 12/2013 Carter
8,640,339 B2 * 2/2014 Gilles ....................... E06B 1/68 29/897.31
8,833,035 B2 9/2014 Vos et al.
8,978,302 B2 3/2015 Ona Gonzalez et al.
D757,300 S 5/2016 Haberland et al.
9,476,250 B2 * 10/2016 Danaud ................. E06B 3/4415
D772,429 S 11/2016 Bergmann
D809,160 S 1/2018 Zuellig
D811,618 S 2/2018 Zuellig
10,900,273 B1 1/2021 Salvoni
11,365,582 B1 6/2022 Salvoni
11,492,832 B2 11/2022 Hernandez
11,680,438 B2 6/2023 Fontijn et al.
12,012,799 B2 6/2024 Salvoni
2003/0226321 A1 12/2003 Engebretson
2004/0074174 A1 4/2004 Biebuyck et al.
2004/0244924 A1 12/2004 Peppett
2006/0059780 A1 3/2006 Petta et al.
2007/0151179 A1 7/2007 Speyer et al.
2007/0234657 A1 10/2007 Speyer et al.
2009/0100760 A1 4/2009 Ewing
2012/0005975 A1 1/2012 KIm
2012/0291392 A1 11/2012 Joray
2013/0097934 A1 4/2013 Cook
2014/0041326 A1 2/2014 Kadavy et al.
2014/0053488 A1 2/2014 Lenox et al.
2014/0182211 A1 7/2014 Lang et al.
2014/0202083 A1 7/2014 Joray
2015/0233177 A1 8/2015 Marchand
2015/0240552 A1 8/2015 Kim
2016/0201383 A1 7/2016 Lenox et al.
2016/0333630 A1 11/2016 Barton et al.
2016/0348418 A1 12/2016 Wexler
2016/0348423 A1 12/2016 Cruysberghs
2018/0038144 A1 2/2018 Metzger
2019/0003227 A1 1/2019 McCoy et al.
2019/0169921 A1 6/2019 De Sousa Guedes
2019/0226257 A1 7/2019 Fontijn et al.
2019/0383078 A1 12/2019 Tsimbikos
2020/0408016 A1 12/2020 Hernandez

* cited by examiner

FRAME ASSEMBLY FOR WINDOWS AND SLIDING DOORS

CLAIM OF PRIORITY

The present application is a Continuation to a currently pending Non-Provisional patent application having Ser. No. 17/845,899, filed Jun. 21, 2022 which is set to mature into U.S. Pat. No. 12,012,799 on Jun. 18, 2024, which is a Continuation of U.S. patent application Ser. No. 17/158,608 filed Jan. 26, 2021, which matured into U.S. Pat. No. 11,365,582 on Jun. 21, 2022, which is a Continuation-in-Part of U.S. patent application Ser. No. 16/654,871 filed Oct. 16, 2019, which matured into U.S. Pat. No. 10,900,273 on Jan. 26, 2021, and is a Continuation-in-Part to an abandoned Non-Provisional patent application having Ser. No. 15/648,666 and a filing date of Jul. 13, 2017 the contents of which are incorporated herein by reference in their entireties.

BACKGROUND OF THE INVENTION

Field of the Invention

The present invention is directed to a frame assembly comprising a frame configured to retain a panel for use in windows and doors. The frame of the present invention comprises a predetermined thickness having a reduced dimension relative to an increased dimension of a predetermined width of the frame. The predetermined thickness and width of the frame cooperatively enhance viewing through the panel and stability of the frame. The frame assembly of the present invention may also be configured for use in sliding glass doors having multiple tracks.

Description of the Related Art

One important aesthetic feature of a window or a sliding glass door is the ability to minimize the visible area of the supporting frame and to maximize the visible area of the panel with the aim of enhancing viewing through the panel. Additionally, structural integrity is a necessary characteristic of a window or door frame assembly in most types of construction applications. More specifically, frame assemblies with impact resistant properties are necessary in many circumstances. There exists in the industry window and door frame assemblies that are impact resistant. Nevertheless, some of the problems with existing impact resistant assemblies are that they often will have a thicker size frame in order to achieve impact resistance. Consequently, portions of the thicker size frame may overlap with a window or door panel to an extent, at least partially obstructing viewing through the panel and reducing visibility. Other problems of some existing frame assemblies are that they often have a thinner size frame that may compromise structural stability or impact resistance.

Thus, there is a need to provide a frame assembly for use in doors and windows having a frame of a size that enhances viewing and at the same time maintains structural integrity and impact resistant properties.

SUMMARY OF THE INVENTION

The present invention is directed to a frame assembly for use in a variety of window and door applications. The frame assembly of the present invention is intended for use in windows and sliding glass doors of buildings, but may be used in other settings. The frame is generally structured to retain a panel, which may be at least partially formed of transparent or translucent material. In preferred embodiments according to the present invention, the frame enhances or at least significantly reduces obstructions to viewing through the panel while at the same time maintaining the stability of the frame. Generally, at least a portion of the frame, and in some embodiments a majority or substantially all of the frame, comprises a predetermined thickness and a predetermined width wherein the predetermined thickness has a reduced dimension relative to the predetermined width. In preferred embodiments of the frame assembly for use as a sliding glass door, the vertical portions of the frame have this predetermined configuration where the predetermined thickness is substantially less that the predetermined width. The predetermined thickness, being substantially less than that the predetermined width, enhances viewing through the panel by minimizing the thickness of the frame portions which would normally obstruct a visible area of the frame. Accordingly, the visible area of the panel will be increased or maximized. In cooperation therewith, the relatively larger dimension of the predetermined width compensates for the relatively decreased predetermined thickness, enhancing or maintaining the stability of the frame.

More specifically, the frame assembly of the present invention includes a frame generally having a support assembly and a cover assembly. The frame may also be in the form of a single piece. The support assembly is generally attached to a securing surface. The securing surface may be a wall, floor, soffit, ceiling, or other structure that supports the frame. The cover assembly may comprise a cover structure having a plurality of latching members and a retaining member, while the support assembly may have a plurality of corresponding latching structures. Together, the plurality of latching members and latching structures may be cooperatively configured to form a mating engagement to collectively interconnect the cover assembly and the support assembly. In preferred embodiments according to the present invention, the support assembly and the cover assembly, are cooperatively structured to retain a panel having varying dimensions. The cover assembly may comprise a retaining member. A cover clamp may be formed on an end of the retaining member. The retaining member or the cover clamp may be disposed in spaced relation with the cap segment of the support assembly. Both the retaining member and the cap segment, or the cover clamp and the cap segment, may be cooperatively configured to retain a panel having varying dimensions. Furthermore, a sealant member may be disposed between the cover clamp and the panel. The sealant member may be made of a variety of products including, but not limited to, elastomeric materials such as polyurethane caulking.

Some embodiments according to the present invention may comprise a plurality of frames disposed in adjacent relation to one another. The frames may be interconnected to each other directly, or may comprise a strengthening member disposed between the frames. The strengthening member may be either unreinforced or internally reinforced. Additionally, the strengthening member may be attached to a securing surface as mentioned above. Other embodiments contemplate the use of an interconnecting member that may attach two adjacent frames, or that may attach a frame to a securing surface.

The frame assembly according to the present invention may comprise a frame having a predetermined thickness of no more than substantially 1 and ½ inches. In some embodiments, the predetermined thickness of the frame may generally be about 1 to about 1 and ½ inches. In other preferred embodiments the predetermined thickness of the frame is about 1 and 3⁄16 inches. Conversely, the predetermined width of the frame may generally be about 2 to about 3 inches. In some embodiments, the predetermined with may be about 2 and 1⁄4 inches to about 2 and 3⁄4 inches. In preferred embodiments according to the present invention the predetermined width is about 2 and 1⁄2 inches.

It is within the scope of the present invention that the frame be not only used in windows and doors, but also in a variety sliding glass door assemblies having several different track configurations. The frame assembly according to the present invention may comprise a sill assembly and a header assembly both interconnected to a securing surface such as a floor, a wall, or a ceiling. The support assembly may be interconnected to a header assembly. The header assembly supports and guides the frame, and more specifically the support assembly. More than one header assembly may also be provided according to the present invention. A header assembly may be attached to a ceiling, while a different header assembly may be attached to a wall. A portion of the frame, and more specifically the support assembly, comprises a track assembly. The sill assembly generally comprises a sill having a roller member and a roller track. Together, the roller member and the track assembly are cooperatively configured so that the roller member supports the track assembly in a movement permitting relation. The frame of the present invention may be moved relative to the header assembly and the sill assembly. The frame assembly may include more than one frame movable relative to the header assembly and the sill assembly. Movement of the frame relative to the header assembly and the sill assembly may be facilitated by a frame handle which may be movably or removably attached to the frame.

It is also within the scope of this invention to provide a track and a header assembly that can accommodate more than one frame via a header assembly and a corresponding sill assembly having multiple tracks each configured to movably retain one frame. The header assembly and corresponding sill assembly may have a configuration having either two, three, or four tracks. More than four tracks may also be possible depending on the need. Some track configurations may comprise a plurality of frames disposed in adjacent relation to one another within the same track. In some embodiments according to the present invention the frame assembly may comprise an interconnecting member that interconnects two adjacent frames, or that interconnects a frame to a securing surface.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The present invention is directed to a frame assembly 1 for use in a variety of applications including doors and windows for buildings. The frame assembly 1 of the present invention may also be used in connection with other applications and is not limited to buildings. Generally, the frame assembly 1 comprises a frame 10 structured to retain a panel 12. The panel 12 may be made of a material such as, but not limited to, glass. The frame assembly 1 according to the present invention comprise a frame 10 that can retain a panel 12. The panel 12 may have impact resistant properties.

Figure 1:
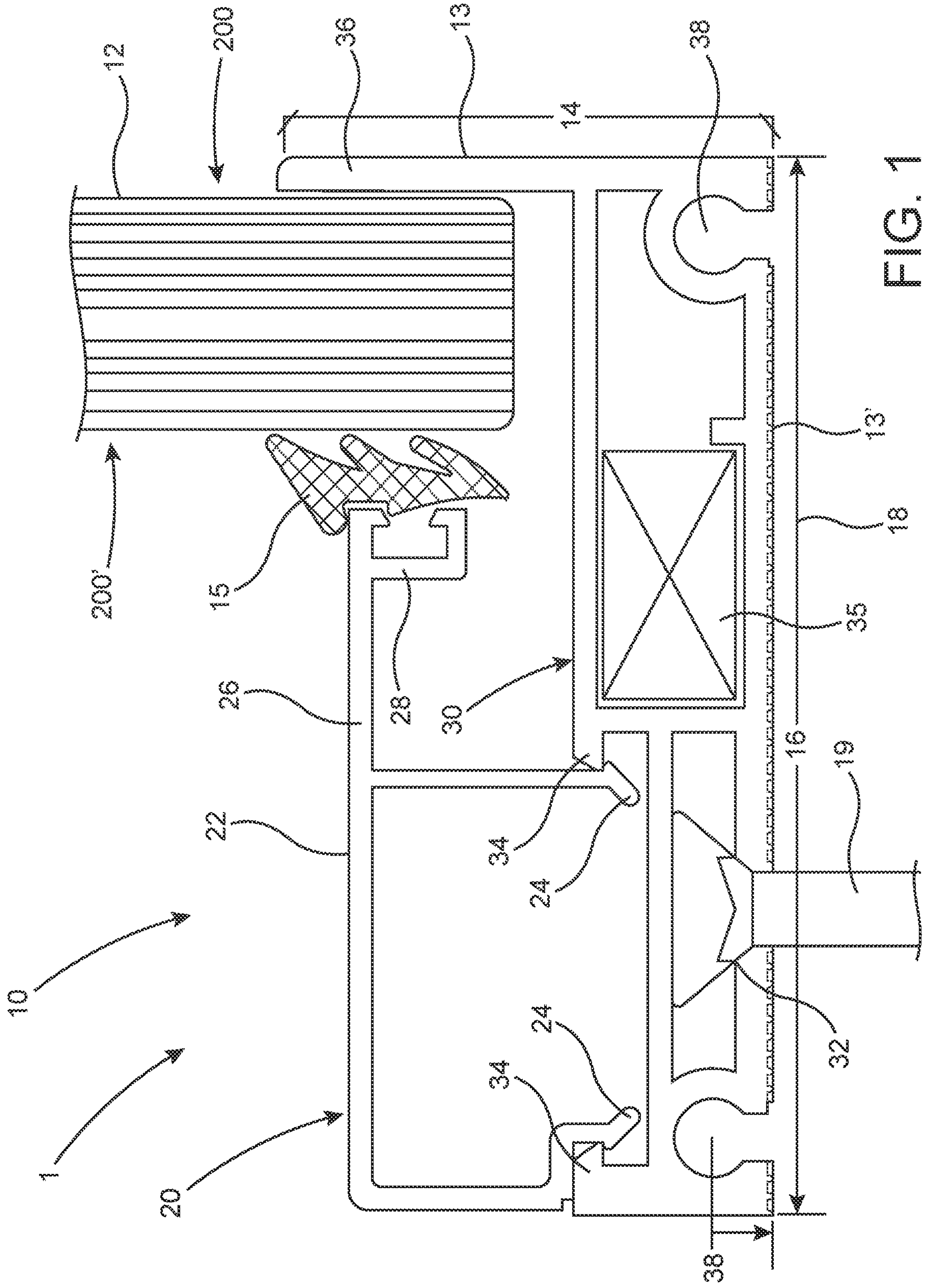
FIG. 1 is a section view of one preferred embodiment of the frame of the frame assembly according to the present invention.

As represented in FIG. 1, at least a portion of the frame 10 has a predetermined thickness 14 and a predetermined width 16. The predetermined thickness 14 is substantially less than the predetermined width 16. As a result, the frame 10 has a predetermined thickness 14 with a reduced dimension that is substantially less relative to a purposefully increased dimension of the predetermined width 16. Viewing through the panel 12, such as along a normally intended line of sight, schematically indicated as 200 in one direction and as 200' in another direction, is enhanced by concurrently and cooperatively maximizing the visible area of the panel 12 relative to the visible area of the frame 10. Viewing through the panel 12, and in more specific terms viewing along a normally intended line of sight 200 or 200', is enhanced by reducing the size of the predetermined thickness 14, due to the fact that a lesser or smaller part of a visually exposed portion of the predetermined thickness 14, as at 13, will be disposed in overlying, visually obstructing relation to the panel 12. It is further recognized that one possibility and/or consequence of reducing the size of the predetermined thickness 14 is that this may derogatorily affect the overall stability of the frame 10 and or at least a portion of the frame 10 which includes the reduced size and/or configuration of the predetermined thickness 14, as indicated.

Therefore, in order to enhance the stability of the frame 10 or at least maintain an appropriate stability thereof, the predetermined width 16 of the same or corresponding portion 13' of the frame 10 is substantially increased. As should be apparent from a view of at least FIG. 1, an increase in the predetermined width 16 of the same and/or corresponding portion 13' will not interfere with the viewing of or through the panel 12, since the increased width 16 is substantially or at least partially aligned with the aforementioned line of sight 200 or 200'.

Therefore, the structural integrity of the frame 10 is also enhanced, or at least maintained, since the relatively increased width 16 of the frame 10 compensates for its relatively decreased thickness 14 and provides an adequate, appropriate and/or required structural stability. Generally, at least a portion 13 of the side of the frame 10, and a portion 13' of the base of the frame 10, has the cooperatively dimensioned, decreased predetermined thickness 14 and correspondingly increased predetermined width 16, respectively. However, the majority, or even all, of the portion 13 and 13' of the frame 10 may have the cooperatively dimensioned, decreased predetermined thickness 14 and correspondingly increased predetermined width 16, respectively.

Figure 2:
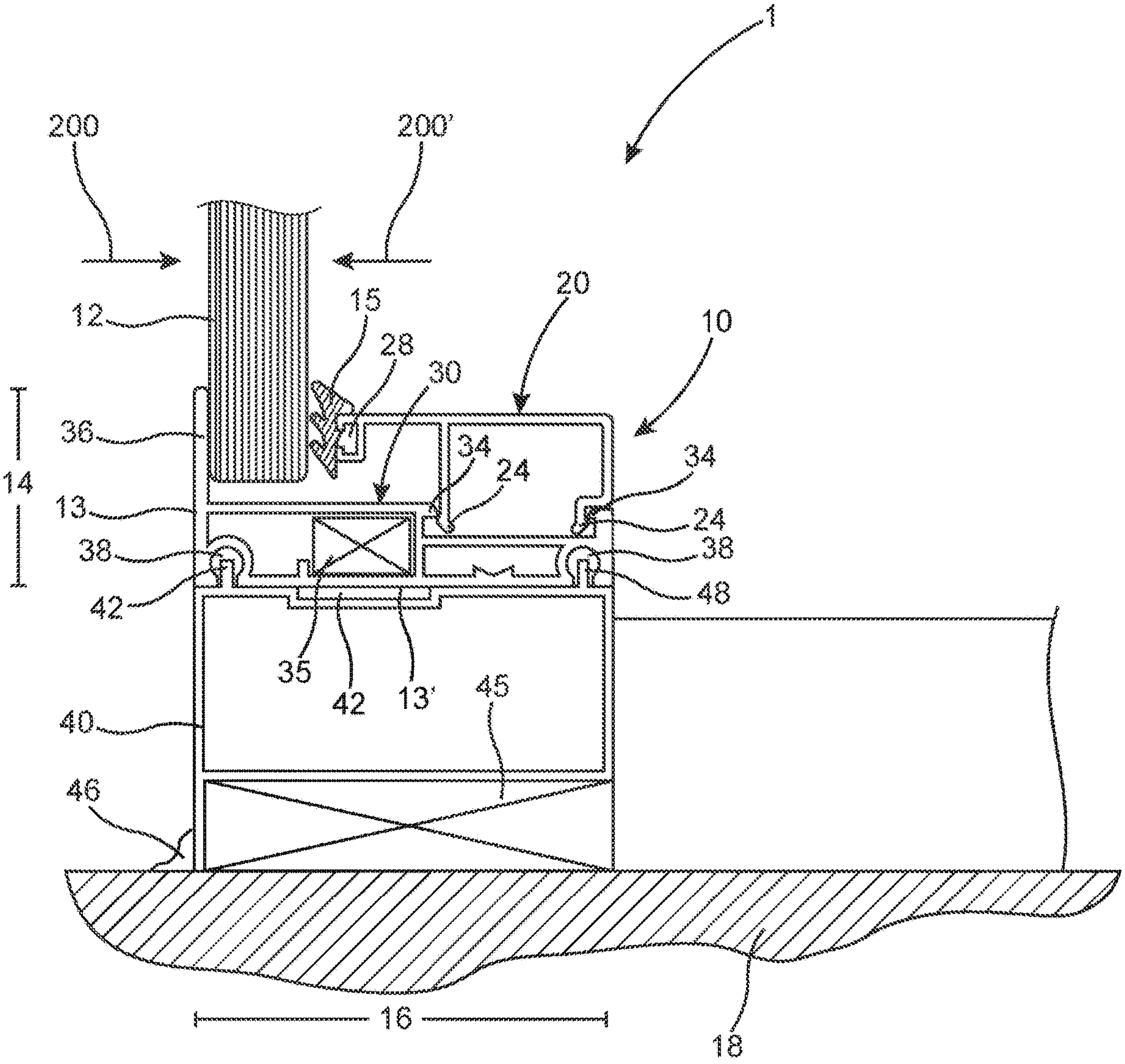
FIG. 2 is a section view of another preferred embodiment of the frame of the frame assembly according to the present invention.
Figure 3:
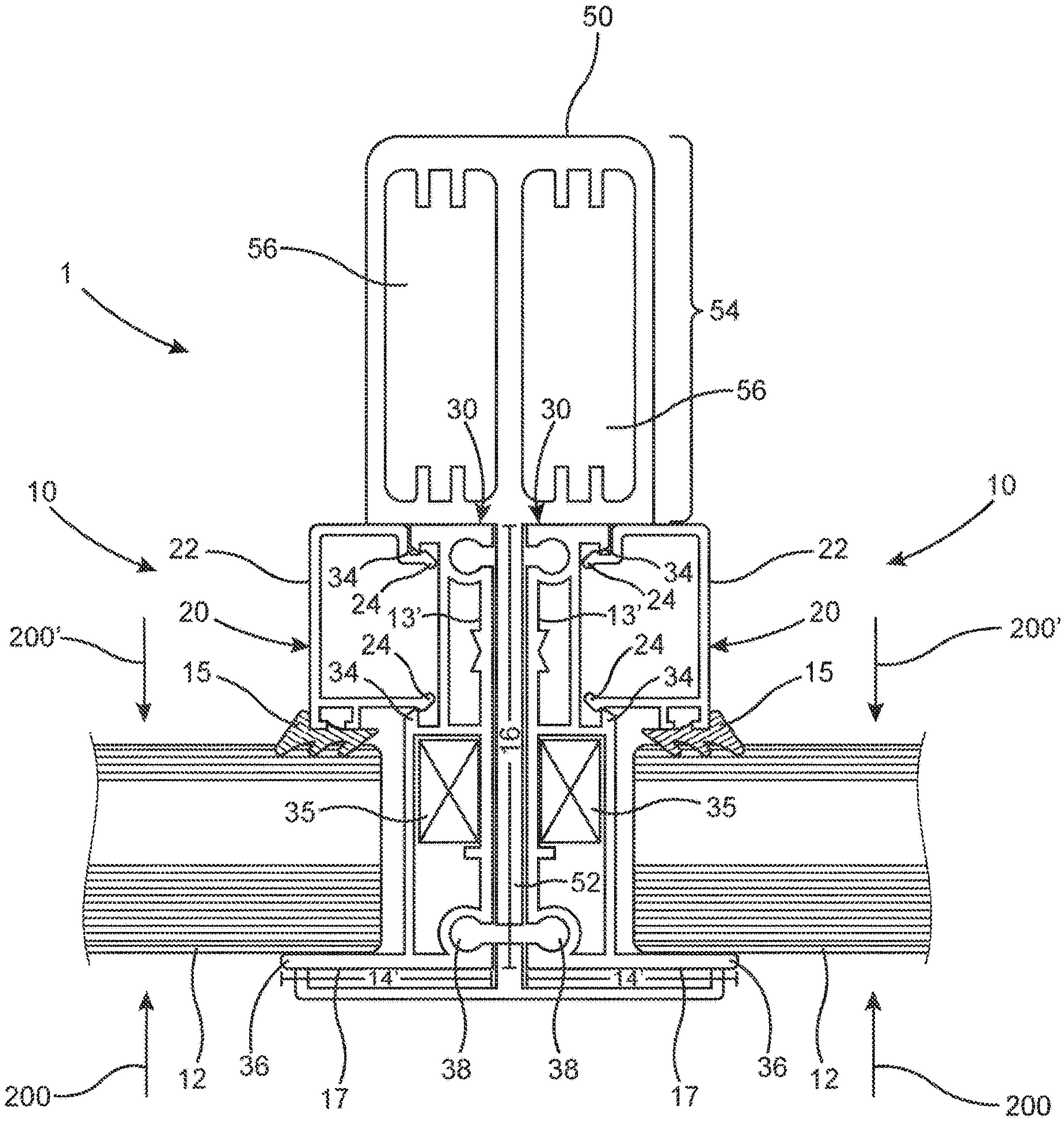
FIG. 3 is a section view of a different preferred embodiment of the frame of the frame assembly according to the present invention comprising a strengthening member.

Turning in detail to the frame assembly 1 of the present invention, as at least represented in FIG. 1, the frame 10 generally comprises a cover assembly 20 interconnected to a support assembly 30. But, the frame could instead be a single piece. The cover assembly 20 and the support assembly 30 may be made out of a variety of materials including, but not limited to, aluminum. The cover assembly 20 generally comprises a cover structure 22. The cover structure 22 may be in the form of a plate, as represented in FIGS. 1-3, or may be in the form of a glass bead, as represented in 6A, 6B, 7, 9, 11A, 11B, 12 and 13. The cover structure 22, whether in the form of a plate or a glass bead, may be made out of a variety of materials such as, but not limited to, aluminum. The cover structure 22 may comprise a plurality of latching members, generally indicated as 24. The cover assembly 20 may also comprise a retaining member 26. Attached to the retaining member 26 may be a cover clamp, generally indicated as 28. The support assembly 30 may have a plurality of latching structures, generally indicated as 34, which are correspondingly positioned to the plurality of latching members 24 of the cover assembly 20. The plurality of latching members 24, and correspondingly disposed latching structures 34, form a mating engagement to interconnect the cover assembly 20 to the support assembly 30. The support assembly 30 is generally connected to a securing surface 18. This securing surface 18 may be a wall, a ceiling, a flooring surface, a soffit, or a different type of surface that supports the frame 10. A variety of connectors, indicated as 19, in FIGS. 13A and 13B, such as concrete or drywall screws or fasteners may be used to interconnect the support assembly 30 to the securing surface 18. Preferred embodiments according to the present invention may include 1 and ½ tapcons to attach the frame 10 to the securing surface 18, but other fasteners may also be used depending on the substrate.

Generally, the cover assembly 20 and the support assembly 30 are cooperatively configured to retain panels 12 which may have varying dimensions. More specifically, the retaining member of the cover assembly 20, and a cap segment 36 of the support assembly 30, are disposed in spaced relation to receive panels 12 of varying dimensions therebetween. In some embodiments according to the present invention, the cover clamp 28 may be disposed in spaced relation relative to the cap segment 36 of the cover assembly 20. The cover clamp 28 may be structured to receive a sealant member 15 that provides a seal to the panel 12. The sealant member 15 may be in the form of caulking, silicone, or other sealant. In preferred embodiments where the frame 10 is made of a hollow material, stability of the frame 10 may be further enhanced by providing a support element 35. By way of example, the support element 35 as shown in FIG. 1 may be a wood buck disposed inside of the frame 10, and more specifically inside the support assembly 20.

As represented in at least FIG. 2, the frame assembly 1 according to the present invention may also include a base 40 structured to support the frame 10. The base 40 may be attached to the securing surface 18 via connectors or via a resin-based material such as, but not limited to, epoxy. The base 40 may have a plurality of protrusions 48 and a recessed portion 42. The frame 10, and in some embodiments the support assembly 30, may have a plurality of grooves 38 that correspond to the protrusions 48 of the base 40. The grooves 38 generally has an opening of sufficient size to receive the protrusions 48. A sealant such as, but not limited to, silicone may be used to secure the plurality of protrusions 48 to the corresponding groove 38. A sealant such as, but not limited to, silicone may also be applied within the recessed portion 42 to secure the frame 10 to the base 40. With further reference to the illustrative example as represented in FIGS. 1 and 2, which show a frame 10 having a cover assembly 20 interconnected to a support assembly 30 attached to a base 40, the predetermined thickness 14 of the frame 10 is substantially less than the predetermined width 16. In the illustrative embodiment as shown in FIG. 2, the base 40 is supported by a support element 45 in the form of a wood buck.

In at least one preferred embodiment, the predetermined thickness 14 is no greater than substantially 1 and ½ inches. In other embodiments, the predetermined thickness 14 may be generally about 1 to 1 and ½ inches. In some preferred embodiments, the predetermined thickness 14 may be about 1 and 3⁄16 inches. The predetermined width 16 may be generally about 2 to about 3 inches. In some embodiments, the predetermined width 16 may generally be about 2 and ¼ inches to 2 and ¾ inches. Other preferred embodiments may comprise a frame 10 with a predetermined width 16 of about 2 and ½ inches. Several other combinations between the predetermined thickness 14 and predetermined width 16 are also possible.

The frame assembly 1 according to the present invention may comprise a plurality of frames 10 disposed in adjacent relation to one another as is shown in the illustrative embodiment of FIG. 3. Preferred embodiments according to the present invention may include two frames 10 interconnected by a strengthening member 50. The strengthening member 50 may comprise an interconnecting portion 52 and a supporting portion 54. The interconnected portion 52 may comprise a serrated or uneven surface to facilitate application of a sealant or other binding material. As such at least a portion of the support assembly 30 of each frame 10 interconnects to the interconnection portion 52 of the strengthening member 50. Other embodiments according to the present invention may comprise a plurality of frames 10 directly interconnected to each other without a strengthening member 50. The strengthening member 50 generally has a supporting portion 54 which may comprise a plurality of cells 56. The cells 56 may be reinforced or unreinforced depending on the need. Additionally, the strengthening member 50 may be interconnected to a support plate 58. The support plate 58 may be connected to the securing surface 18 by connectors or by a resin-based material. Additionally, the support plate 58 may have a plurality of flanges 59 each of which corresponds to one of the plurality of cells 56 of the strengthening member 50. As such, each of the plurality of cells 56 may be have a dimension sufficient to receive a corresponding one of the plurality of flanges 59 of the support plate 58.

Figure 4:
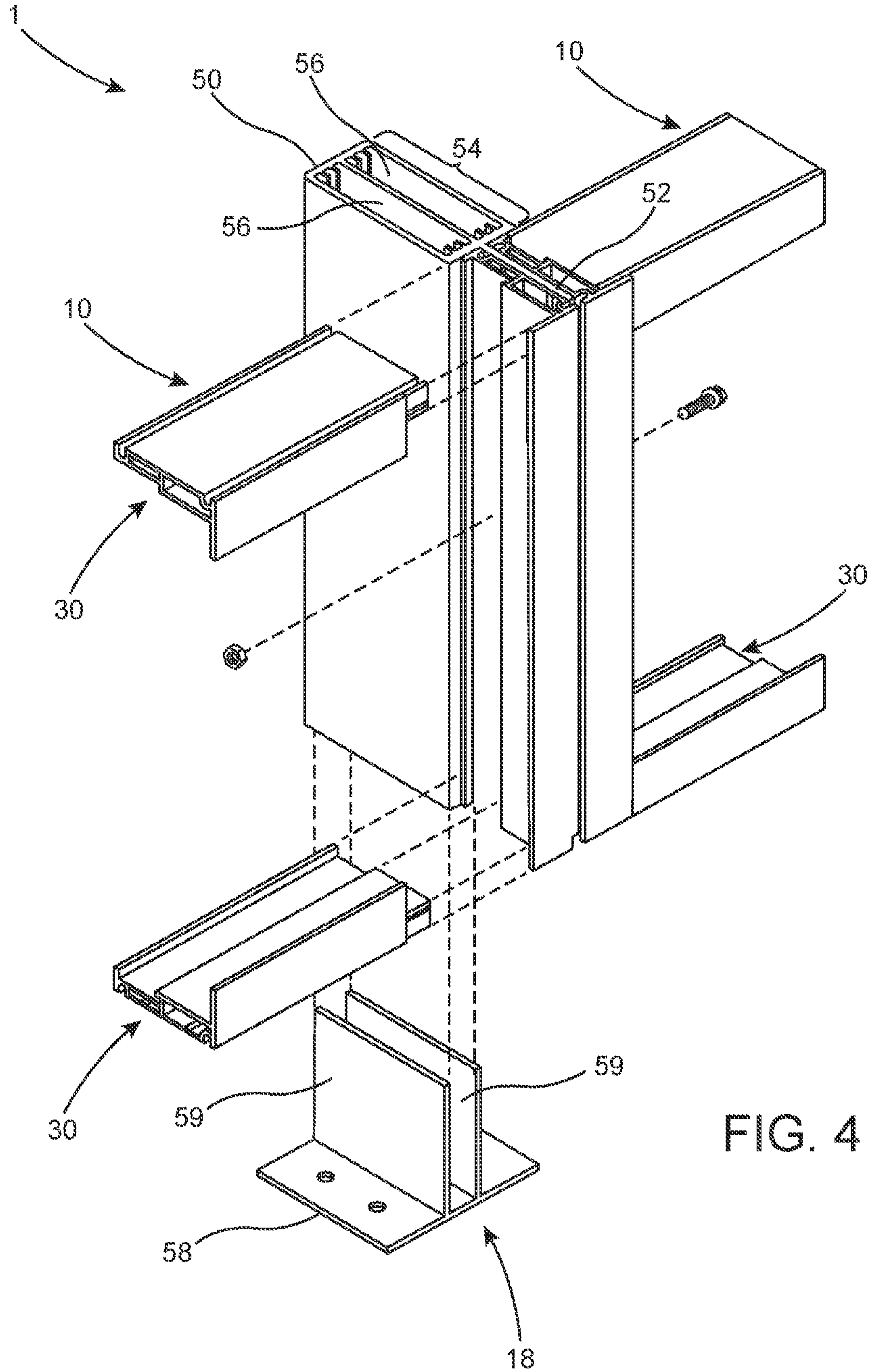
FIG. 4 is a perspective exploded view in partial cutaway of one preferred embodiment of a part of a window frame of the present invention comprising two frames disposed adjacent to one another and a strengthening member.
Figure 5B:
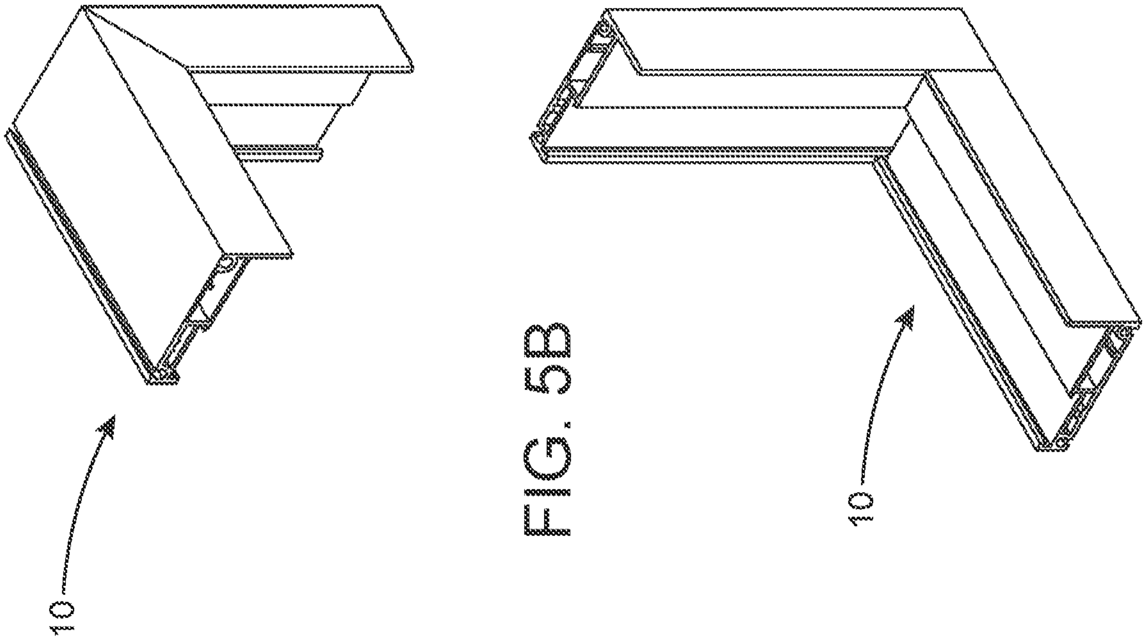
FIG. 5B is an assembled perspective view of the embodiment as shown in FIG. 5A.
Figure 5A:
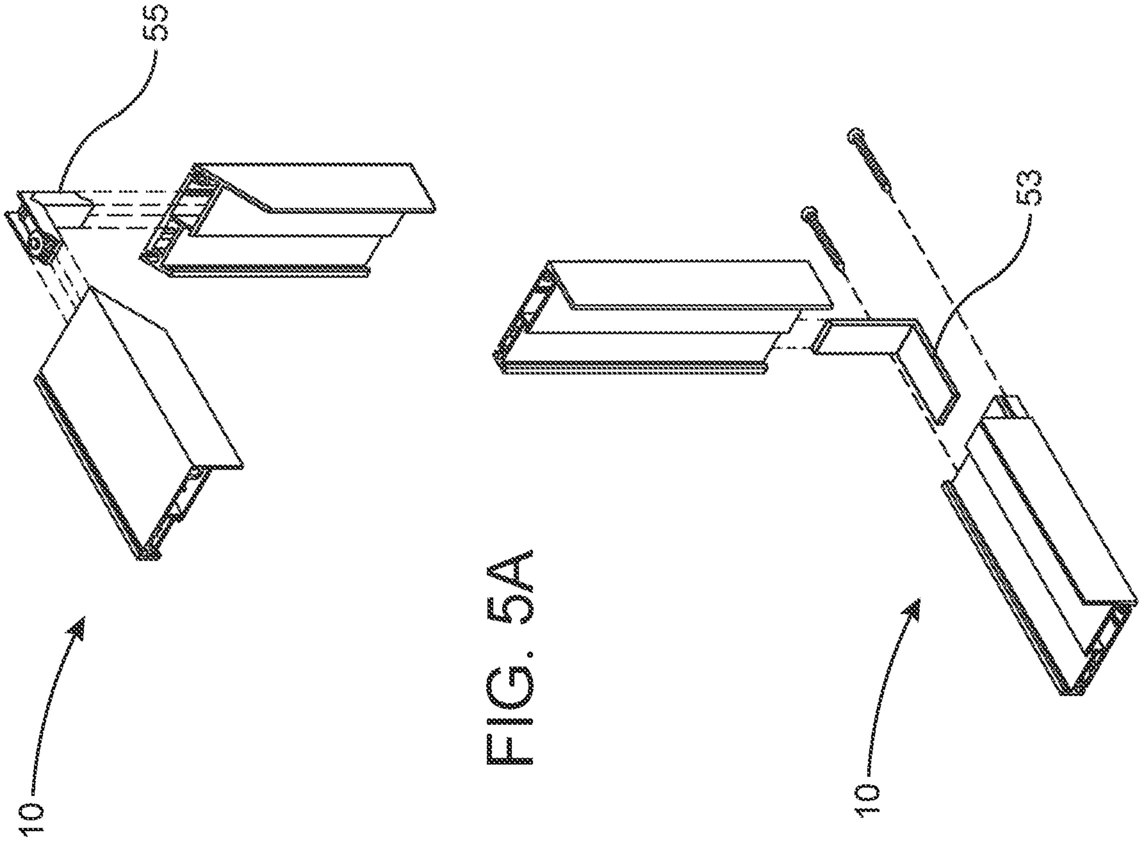
FIG. 5A is a perspective exploded view of one preferred embodiment of part of a window frame of the present invention.

To further improve the aesthetic appearance of the frame assembly 1, a cover cap 57 may be disposed one side of the frame 10. The illustrative embodiment of FIG. 3 shows two frames 10 interconnected by a strengthening member 50, and a cover cap 57 disposed on one end of the frames 10. The illustrative embodiment as shown in FIG. 4 shows a portion of two frames 10 interconnected by a strengthening member 50 and a support plate 58 disposed on one end of the strengthening member 50. As can be appreciated, the support plate 58 and the strengthening member 50 cooperatively enhance the stability of the frame(s) 10 by adding further points of attachment to the securing surface 18 and by providing an additional structural element along the length of the frame 10. Additional structural members may be added to the frame 10, and in some embodiments, specifically to the support assembly 30. The Illustrative embodiment as represented in FIG. 5A shows an angle 53 disposed within adjoining sections of the frame 10. Further, the illustrative embodiment as represented in FIG. 5A also shows two adjoining sections of a frame 10 interconnected by a coupler 55.

Figure 6A:
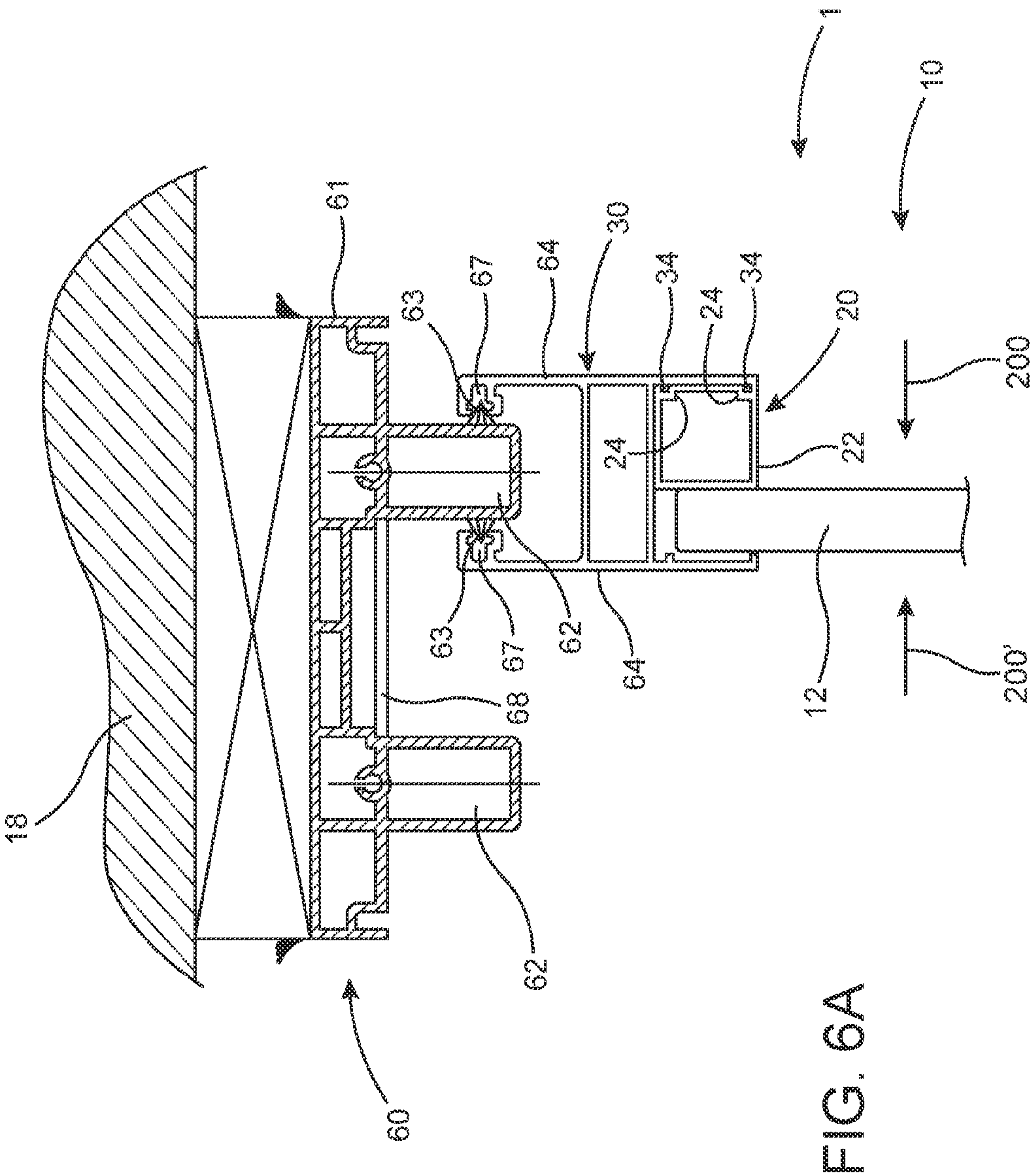
FIG. 6A is a section view of one preferred embodiment of the frame assembly of the present invention comprising a frame disposed on a header assembly.
Figure 6B:
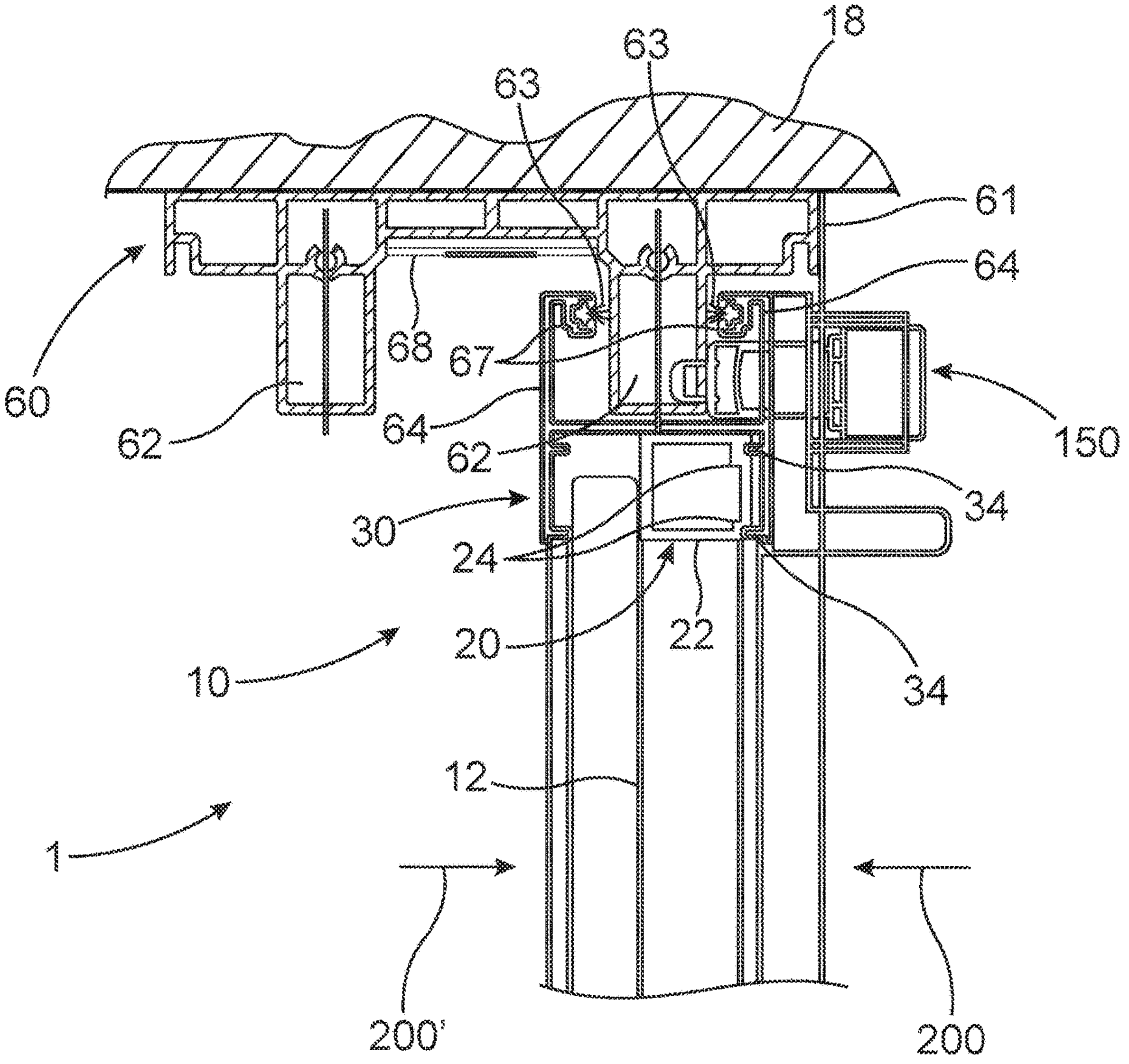
FIG. 6B is a section view of another preferred embodiment of the frame assembly of the present invention comprising a frame disposed on a header assembly and a lock assembly.
Figure 7:
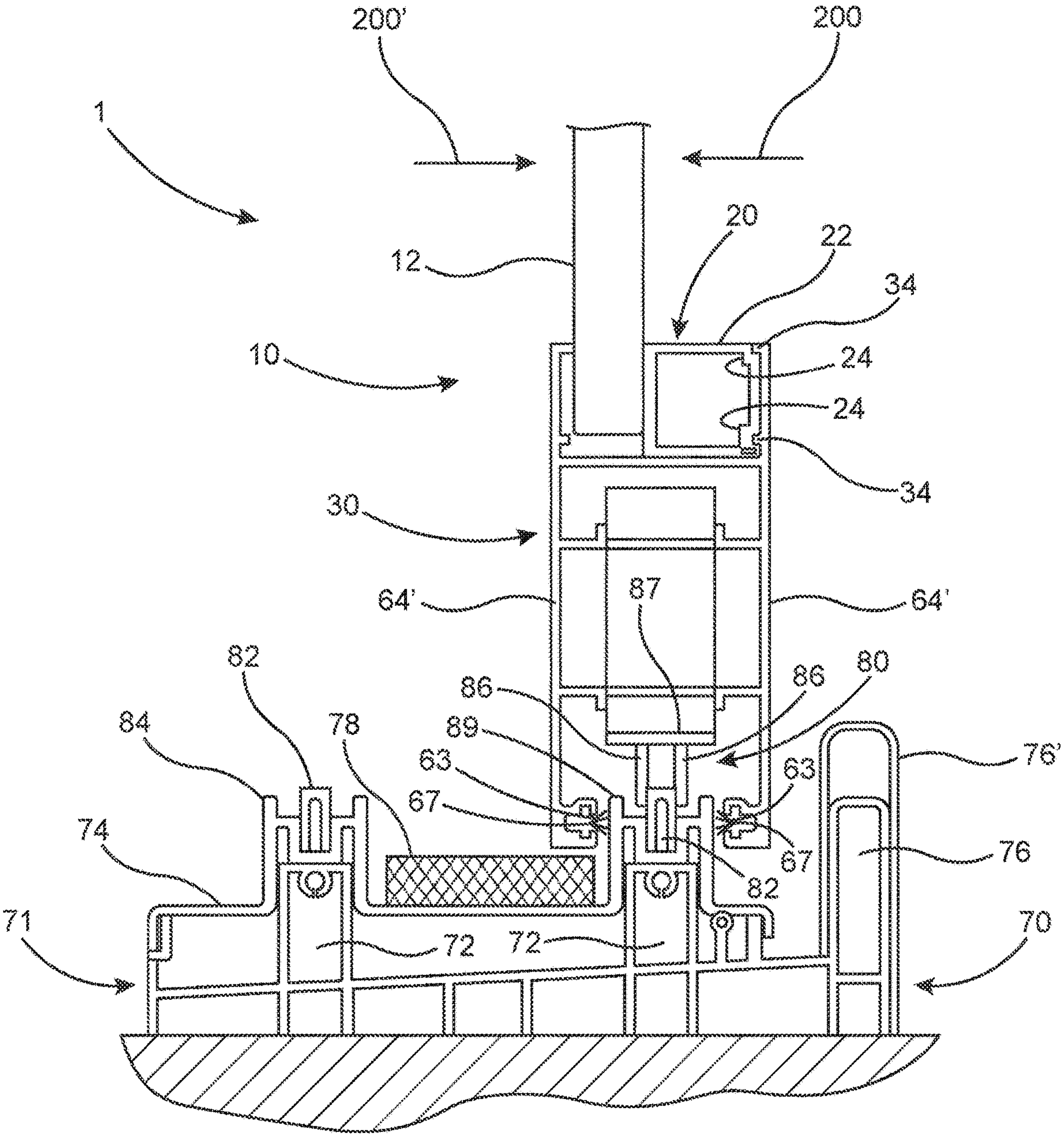
FIG. 7 is a section view of one preferred embodiment of the frame assembly of the present invention comprising a frame disposed on a sill assembly.
Figure 8A:
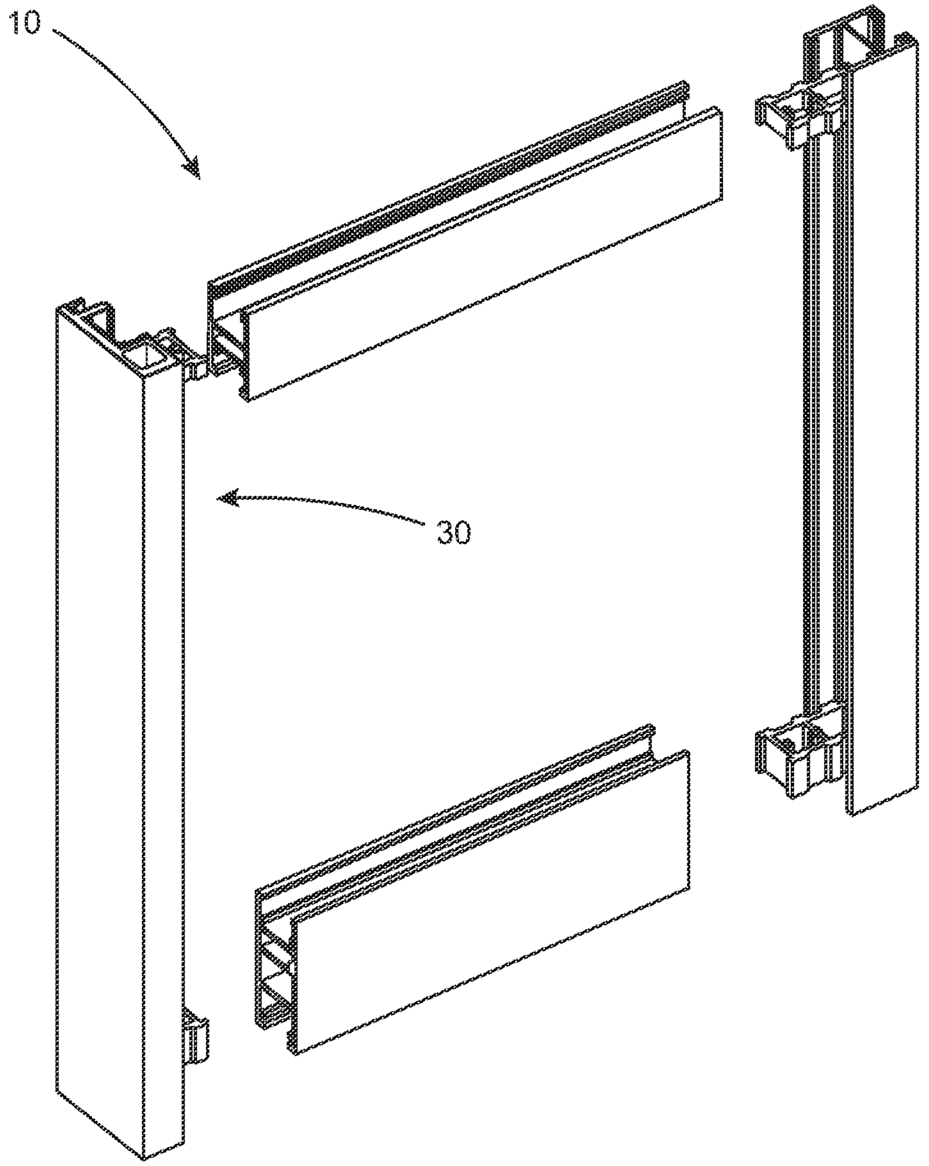
FIG. 8A is an exploded perspective view of one preferred embodiment of a frame of a sliding glass door of the present invention.
Figure 8B:
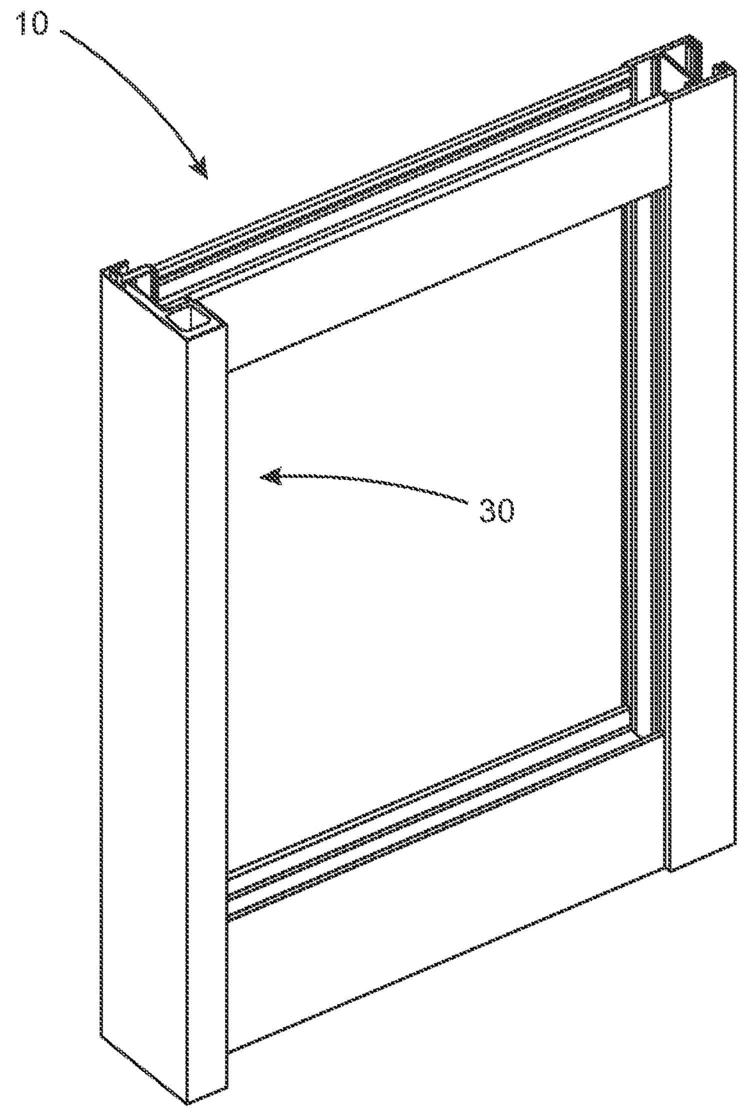
FIG. 8B is an assembled perspective view of the embodiment as shown in FIG. 8A.
Figure 8D:
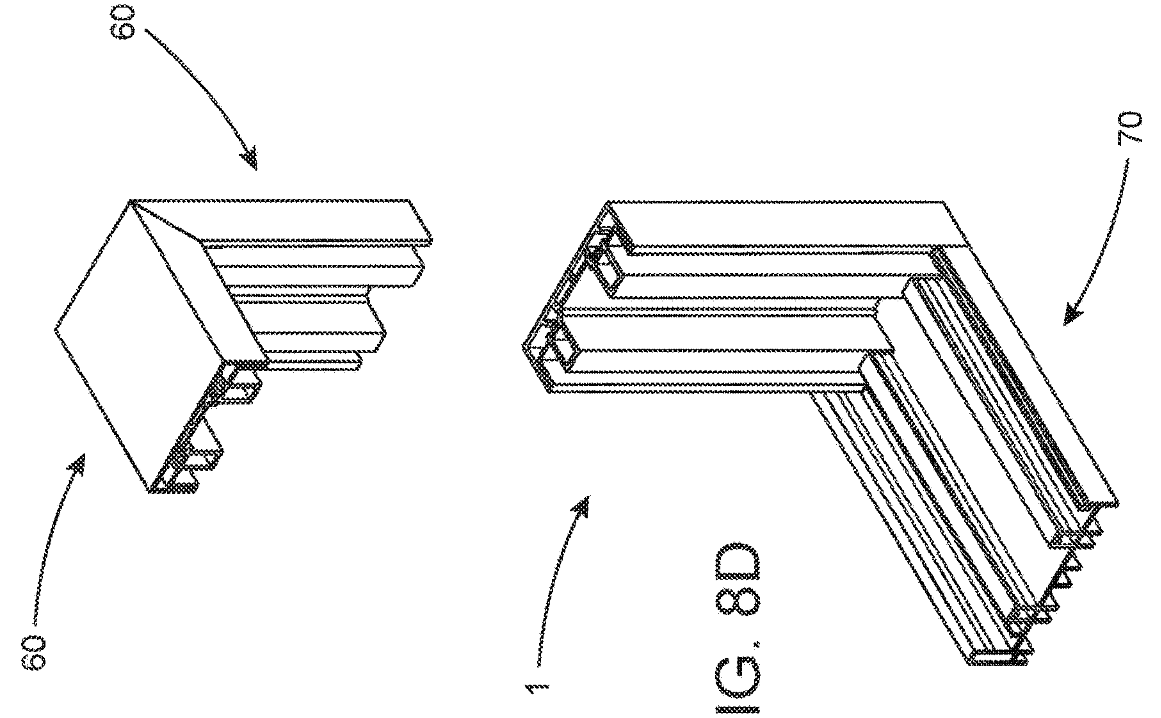
FIG. 8D is an assembled perspective view of the embodiment as shown in FIG. 8C.
Figure 8C:
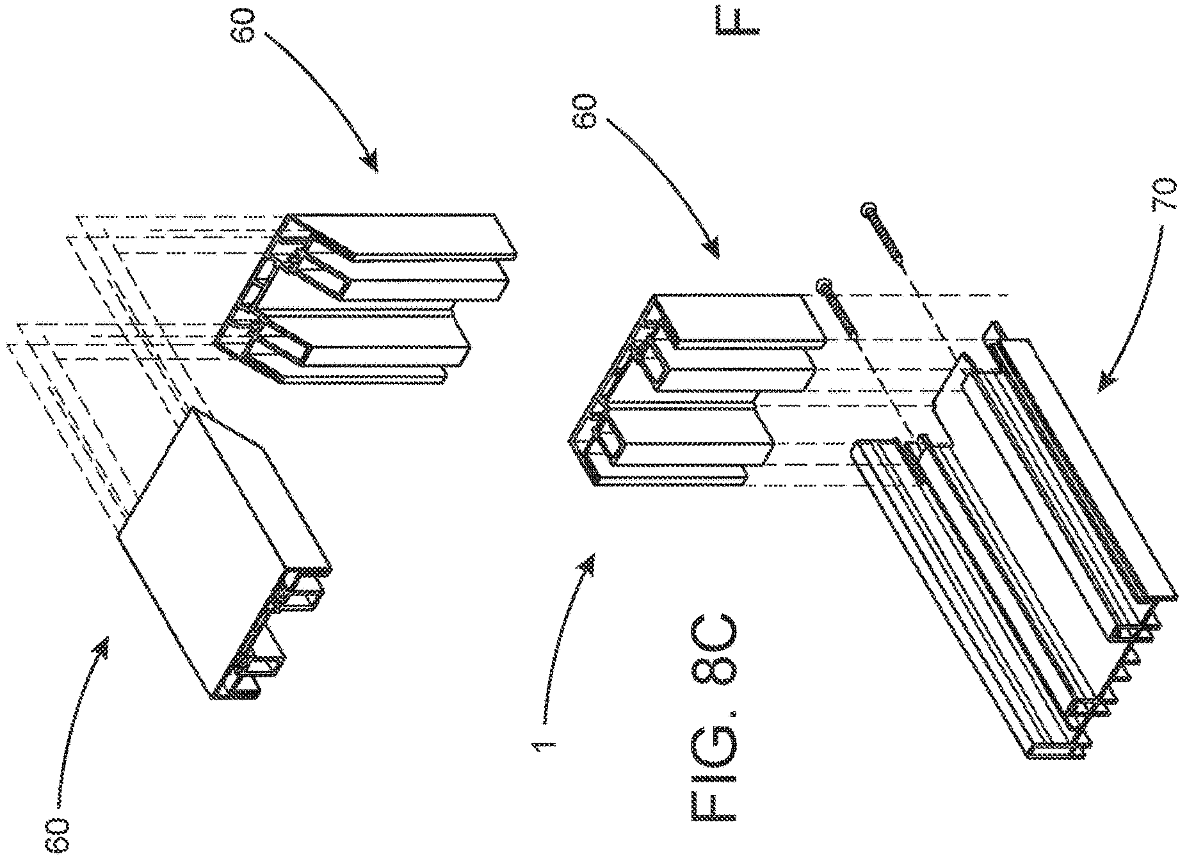
FIG. 8C is an exploded perspective view of one preferred embodiment of a header assembly and a sill assembly of a sliding glass door of the present invention.
Figure 9:
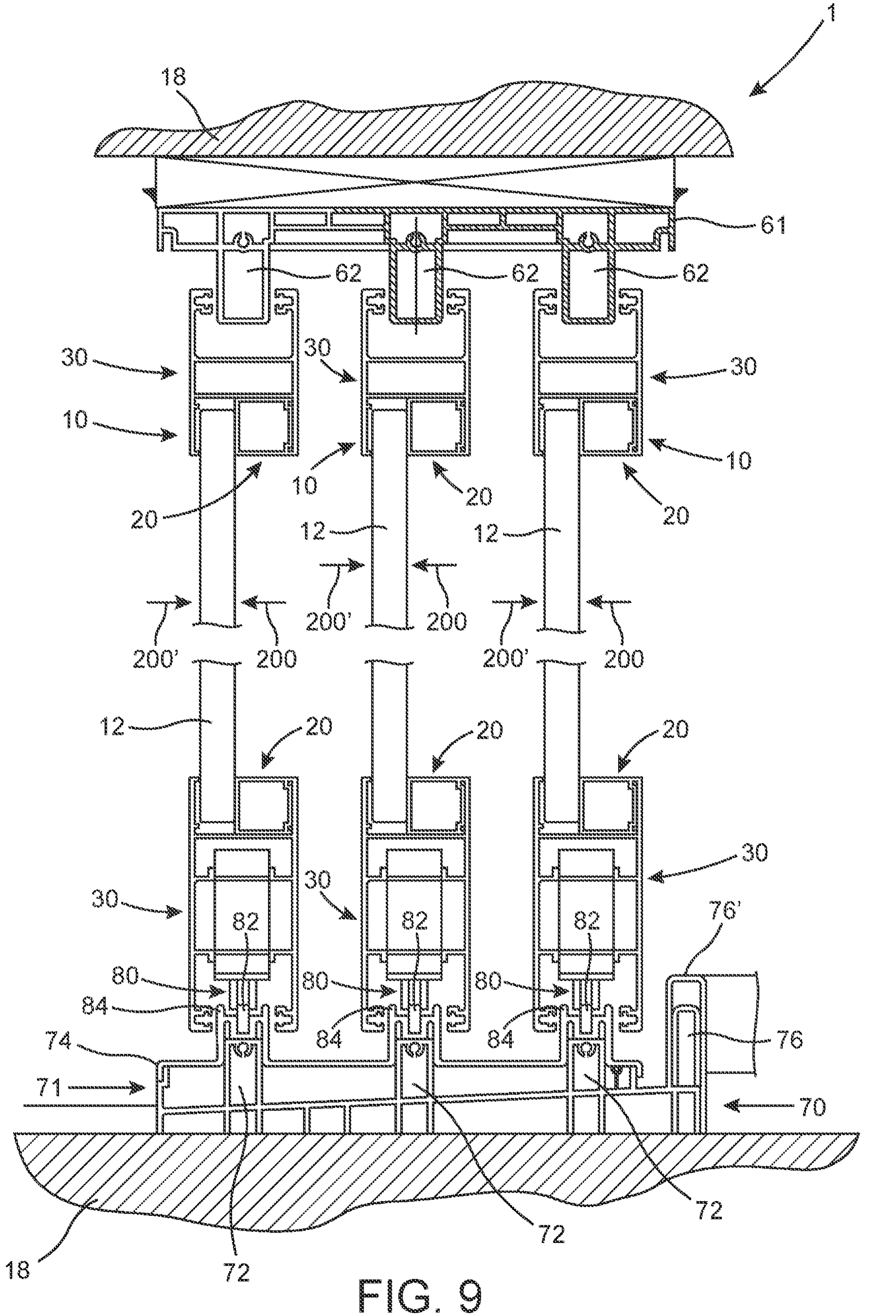
FIG. 9 is a section view of one preferred embodiment of part of a sliding glass door according to the present invention comprising three tracks.

As represented in at least FIG. 9, the frame assembly 1 of the present invention may also be configured for use as a sliding glass door. As represented in FIGS. 6-9, the present invention may comprise a header assembly and a sill assembly, generally indicated as 60 and 70 respectively. The header assembly comprise a header member 62, a header base 61, a header cover and a header support 68. A plurality of header connectors 64 may be disposed on one end of the support assembly 30 of the frame 10. Furthermore, the header connectors 64 may comprise a retaining portion, generally indicated as 67. As is shown in the illustrative embodiments of FIGS. 6A and 6B, the header connectors 64 may be disposed in spaced relation relative to each other and surrounding a header member 62. To further facilitate alignment of the frame 10 relative to the header assembly, a plurality of corresponding alignment members 63 may be disposed on each of the header connectors 64. More specifically the alignment members 63 may be disposed within the retaining portion 67. The alignment members 63 may be in the form of a weather-stripping member. As can be appreciated in the illustrative embodiments represented in FIGS. 6A and 6B, a header support may be placed on the sill base 61 to reduce any gaps that may exist between the base 61 and the header connectors 64. The header support 68 also permits movement of the frame 10 relative to the header base 61. An additional sealant member 15' may also be disposed on a different part of the frame 10. Also, as represented in FIGS. 7-9, the frame assembly 1 of the present invention may also comprise a sill assembly 70 which supports the frame 10. Preferred embodiments according to the present invention comprise a frame assembly 1 having both a header assembly 60 to support a frame 10 on one end, and a sill assembly 70 to support a different frame 10 on another end. The header assembly 60 and the sill assembly 70 may both be attached to a securing surface 18. By way of example only, the header assembly 60 may be attached to a ceiling, a wall, or a soffit, while the sill assembly 70 may be attached to a flooring surface such as a concrete slab. Generally, the frame assembly 1 comprises at least one frame 10 supported by both a header assembly 60 and a sill assembly 70.

The sill assembly 70 of the frame assembly 10 according to the present invention generally comprises a sill base 71 attached to a securing surface 18, and a sill cover 74 having a plurality of tracks 84 formed thereon. The sill cover 74 may also have at least one expansion chamber formed therein. Alternatively, the tracks 84 formed on the sill cover 74 may at least partially comprise or define at least one expansion chamber 87. A plurality of sill members 72 may also be formed on the sill base 71 to support a corresponding track 84. The corresponding track 84 again, also able to at least partially comprise or define at least one expansion chamber 87. The illustrative embodiment as represented in FIG. 7 shows a frame 10 disposed within a sill assembly 70 having two tracks 84 and two expansion chambers 87. As can be appreciated from the illustrative embodiment as represented in FIG. 7, a sill assembly 70 comprises a sill base 71 and a sill cover 74 interconnected to the sill base 71. As can also be seen from the illustrative embodiment of FIG. 7, the sill cover 74 comprises two tracks 84 formed thereon. Further, the two tracks preferably include expansion chambers formed therein. Each track 84 is generally structured to receive a roller member 82. The roller member 82 is rotationally connected to the sill assembly 70. The roller members 82 are also at least partially retained by the expansion chambers 87.

With primary reference to FIG. 9, the frame assembly 1 may comprise a track assembly substantially formed on a portion of the support assembly 30 of the frame 10. The track assembly 80 may comprise a plurality of sill connectors 64' disposed in spaced relation relative to one another. The sill connectors 64' generally surround a portion of the track cover 74. Similar to the header connectors 64 of the header assembly 60, the sill connectors 64' of the sill assembly 70 may each comprise retaining portion 67 and alignment members 63 disposed thereon. Additional elements such as a sill support 78 may also be disposed on the sill cover 74 to facilitate supporting the frame 10. To improve the aesthetic appearance of the frame assembly 1, the sill assembly 70, and more specifically the sill base 76, may comprise a sill segment 76 to cover at least a portion of the sill assembly 70. Moreover, a sill extension 76' may be disposed on the sill segment 76 further cover the sill assembly 70.

As also represented in FIGS. 7, 9, 14A and 14B the track assembly 80 generally comprises two tracks 84 and preferably two expansion chambers 87 at least partially interconnected to the sill assembly 70. The tracks 84 and the expansion chambers 87 are disposed on the roller member 82. Generally, the frame 10, and more specifically the tracks 84 of the track assembly 80, are movable relative to the sill assembly 70. As such, in preferred embodiments according to the present invention, the frame 10 is movable relative to both the sill assembly 70 and the header assembly 60. Some embodiments according to the present invention may comprise a plurality of frames 10 disposed within the header assembly 60 and the sill assembly 70.

Figure 14A:
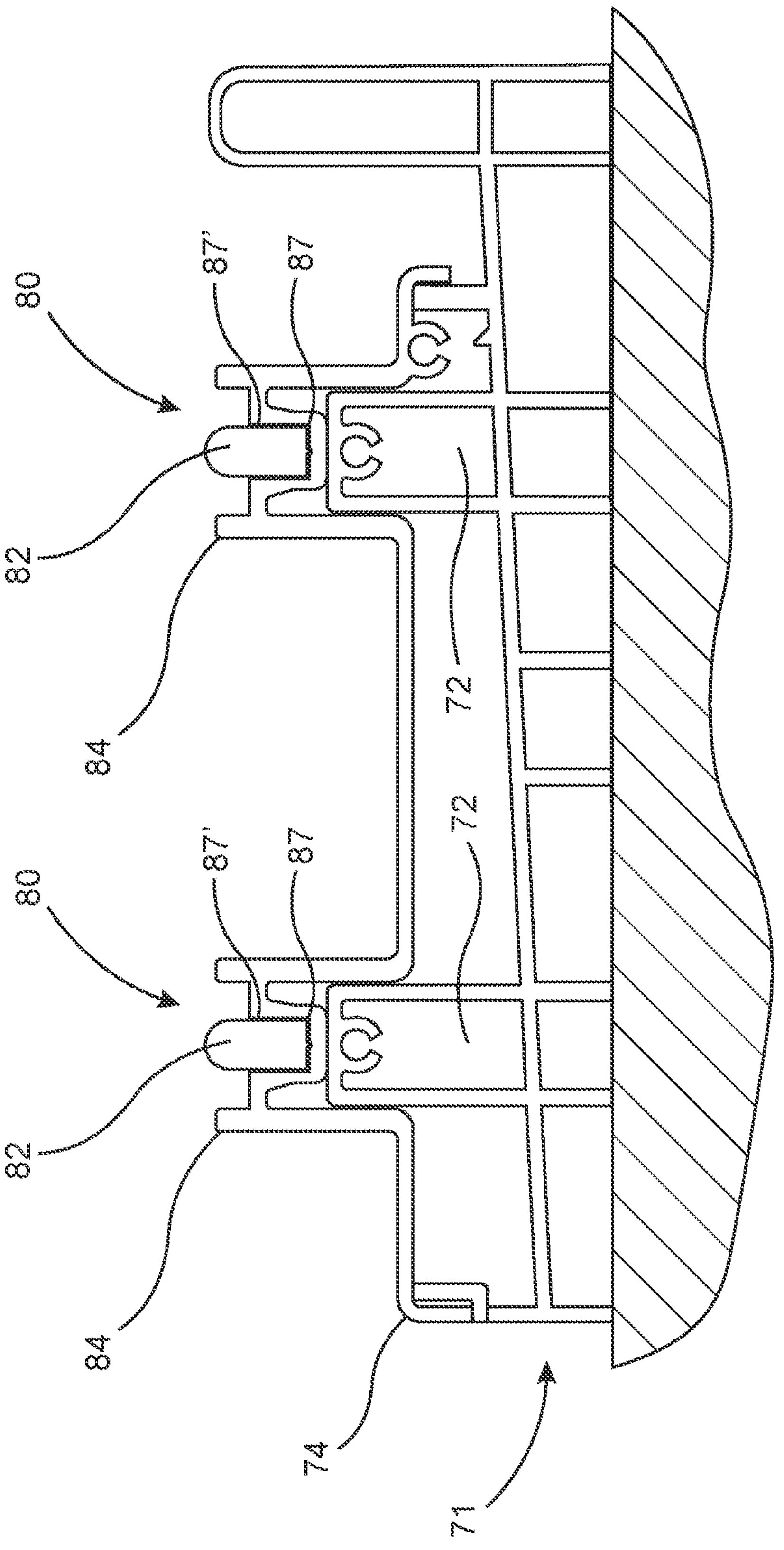
FIG. 14A is a section view of one preferred embodiment of the sill assembly and portions of the track assembly in one orientation.
Figure 14B:
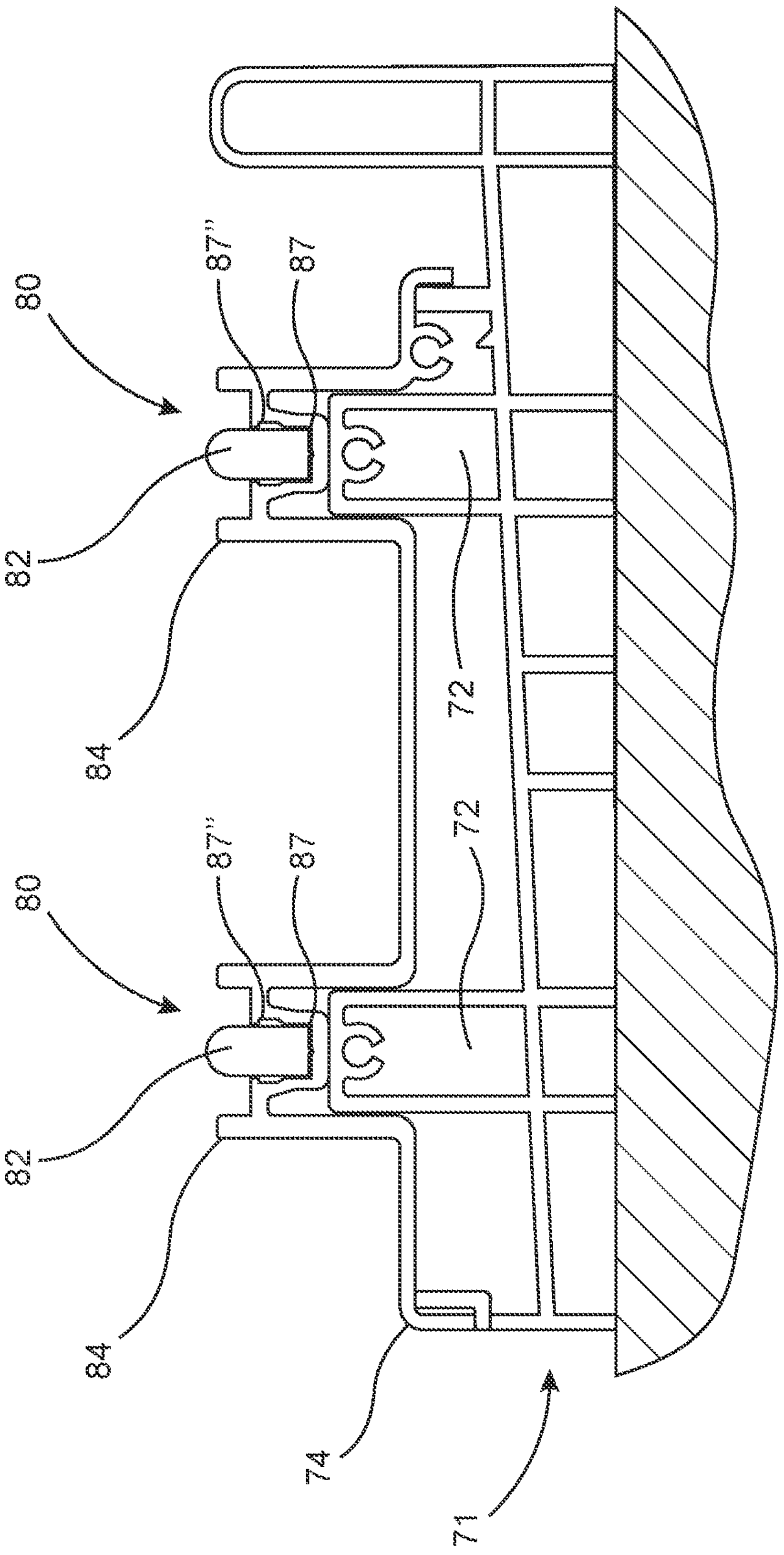
FIG. 14B is a section view of one preferred embodiment of the sill assembly and portions of the track assembly in another orientation.

With primary reference to FIGS. 14A and 14B, the sill assembly 70 may comprise at least one expansion chamber 87, wherein the sill cover 74 at least partially defines an expansion chamber 87. In an alternative embodiment, and by way of example, the tracks 84 formed on the sill cover 74 may comprise or define an expansion chamber 87, the expansion chamber 87 structured to retain, receive, operatively connect or rotationally connect at least a portion of a roller member 82 or other portions of the track assembly 80.

By way of a non-limiting example, the roller member 82 when retained, received, operatively connected, or rotationally connected at least to a portion of the expansion chamber 87, may exert a force upon the tracks 84 or any other portion of the sill assembly 70 that the roller member 82 is in contact with. Such a force or contact may induce frictional forces that hinder the ability of the track assembly 80 to move or operate properly in relation to the sill assembly 70. In another embodiment, the force or contact may induce forces upon the sill assembly 70 or portions thereof.

As such, expansion chambers 87 are included and structured at least to expand from a constricted or resting state 87' to an expanded state 87". At least when the expansion chamber 87 is comprised or defined by the tracks 84, the expansion chamber 87 can expand from a resting state 87' to an expanded state 87". In such a situation, upon expansion of the expansion chamber 87, the tracks 84 also expand from a resting state to an inflated state. The expansion of the tracks 84 is attributable to a displacement in volume of the expansion chamber 87, at least when in said expanded state 87".

In one embodiment, expansion of the expansion chamber 87 occurs at least partially when a force is inflicted on the expansion chamber 87 or surrounding areas of the sill cover 74 by a portion of the track assembly 80. In the same or other embodiments, expansion of the expansion chamber 87 may reduce frictional forces existing between a portion of the sill cover 74 and the track assembly 80. In the same or other embodiments, expansion of the expansion chamber 87 may more equally distribute forces inflicted upon the sill cover 74 via the track assembly 80.

It is within the scope of the present invention that the frame 10 of the present invention be used not only in windows but also in sliding glass door assemblies. It is also within the scope of the present invention to provide a frame assembly 1 comprising a plurality of frames 10 for use as sliding glass doors. Both the header assembly 60 and the sill assembly 70 may be configured to support more than one frame 10. As such, the sill assembly 70 may comprise a plurality of tracks 84 and/or a plurality of expansion chambers 87 while the header assembly 60 may comprise a plurality of corresponding header members 62. The illustrative embodiment as shown in FIGS. 6A and 6B shows a header assembly 60 having two header members 62 while the illustrative embodiment as represented in FIG. 7 shows a sill assembly 70 having two tracks 84 and two expansion chambers 87 that correspond to each frame 10 and each header member 62. Therefore, two frames 10 may be movably disposed on the header assembly 60 and the sill assembly 70. It is also possible, and within the scope of the present invention, to provide a frame assembly 1 having a header assembly 60 and a sill assembly 70 configured to receive more than two frames 10. As such the frame assembly 1 of the present invention may be used as a sliding glass door assembly having multiple tracks 84 and multiple expansion chambers 87 with corresponding frames 10. In preferred embodiments according to the present invention, the frames 10 may be movable.

Figure 10A:
FIG. 10A is a top section view of one preferred embodiment of a sliding glass door according to the present invention comprising two tracks and two frames.
Figure 10B:
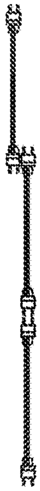
FIG. 10B is a top section view of another preferred embodiment of a sliding glass door according to the present invention comprising two tracks and three frames.
Figure 10C:
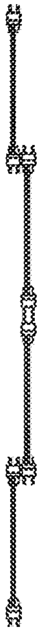
FIG. 10C is a top section view of a different preferred embodiment of a sliding glass door according to the present invention comprising two tracks and four frames.
Figure 10D:
FIG. 10D is a top section view of another preferred embodiment of a sliding glass door according to the present invention comprising two tracks and four frames.
Figure 10E:
FIG. 10E is a top section view of another preferred embodiment of a sliding glass door according to the present invention comprising two tracks and two frames.
Figure 10F:
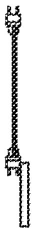
FIG. 10F is a top section view of a preferred embodiment of a sliding glass door according to the present invention comprising one track and one frame.
Figure 10G:
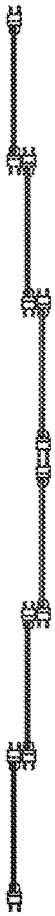
FIG. 10G is a top section view of a preferred embodiment of a sliding glass door according to the present invention comprising two tracks and six frames.
Figure 10H:
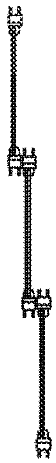
FIG. 10H is a top section view of another preferred embodiment of a sliding glass door according to the present invention comprising three tracks and three frames.
Figure 10I:
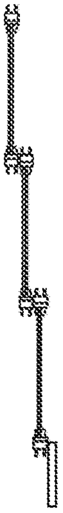
FIG. 10I is a top section view of yet another preferred embodiment of a sliding glass door according to the present invention comprising three tracks and three frames.
Figure 10J:
FIG. 10J is a top section view of a different preferred embodiment of a sliding glass door according to the present invention comprising three tracks six frames.
Figure 10K:
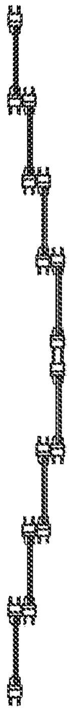
FIG. 10K is a top section view of a preferred embodiment of a sliding glass door according to the present invention comprising four tracks and eight frames.
Figure 10L:
FIG. 10L is a top section view of another preferred embodiment of a sliding glass door according to the present invention comprising four tracks and four frames.
Figure 10M:
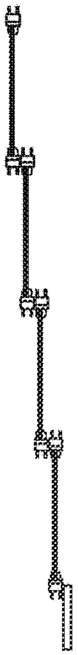
FIG. 10M is a top section view of a yet another preferred embodiment of a sliding glass door according to the present invention comprising four tracks and four frames.
Figure 10N:
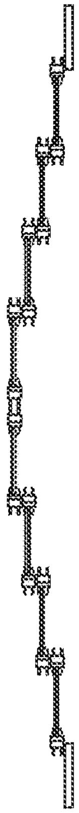
FIG. 10N is a top section view of a different preferred embodiment of a sliding glass door according to the present invention comprising four tracks and eight frames.

Some embodiments according to the present invention may comprise more than one header assembly 60. By way of example, FIGS. 8A-8D shows a portion of a frame assembly 1 comprising two header assemblies 60 and a sill assembly 70, with a corresponding frame 10. The illustrative embodiment as shown in FIG. 9 shows a frame assembly 1 having three tracks 84. As can be appreciated from the illustrative embodiment of FIG. 9, each of the three tracks 84 with corresponding roller members 82 supports a frame 10. Further embodiments comprising a combination between two to four or more tracks 84, and one to eight or more frames 10, are also possible. The illustrative embodiments as shown in FIGS. 10A-ION represent some of the combinations between tracks 84 and frames 10 that can be achieved.

Figure 11A:
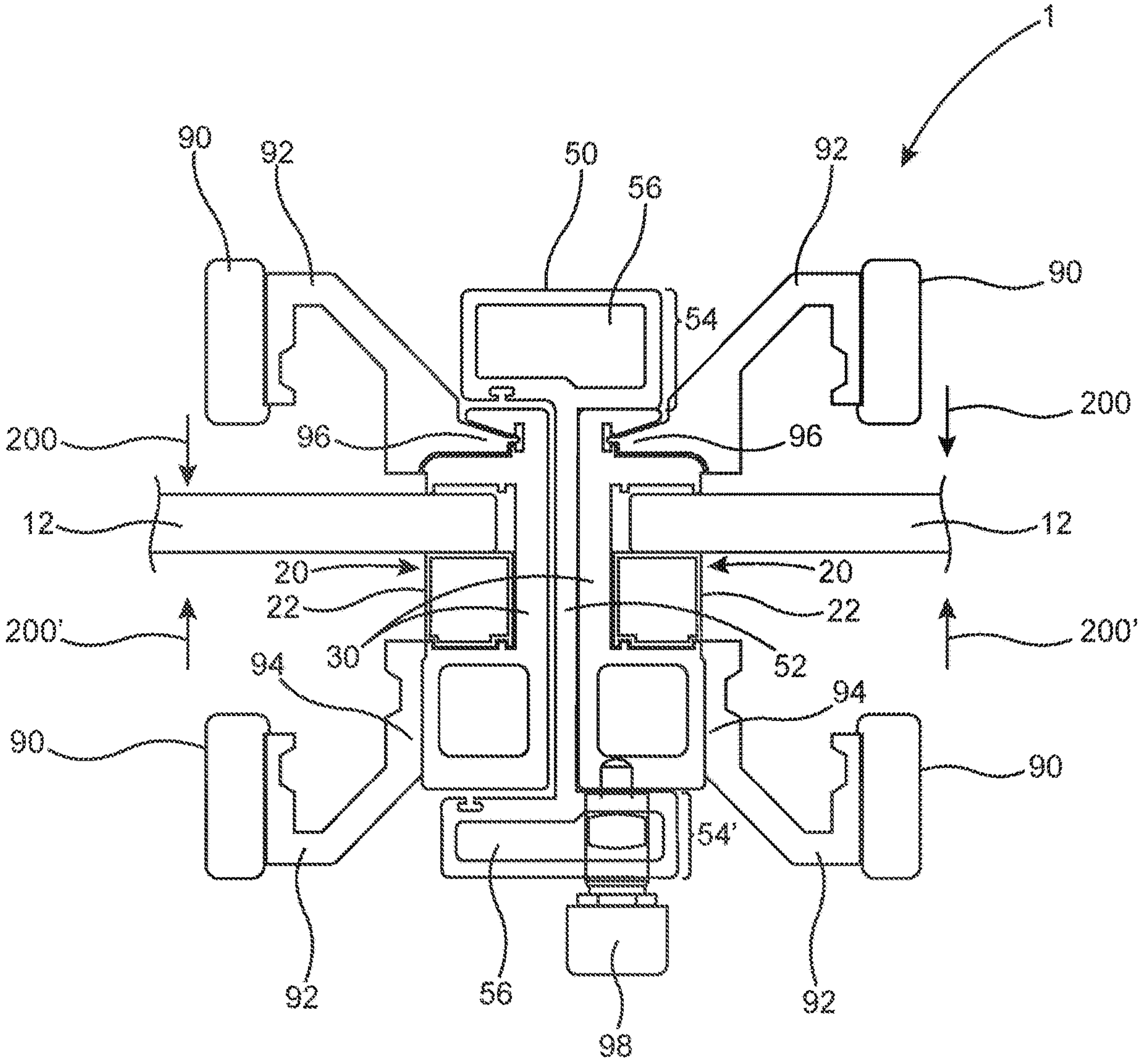
FIG. 11A is a top section view of a one preferred embodiment of a sliding glass door according to the present invention comprising a strengthening member.
Figure 11B:
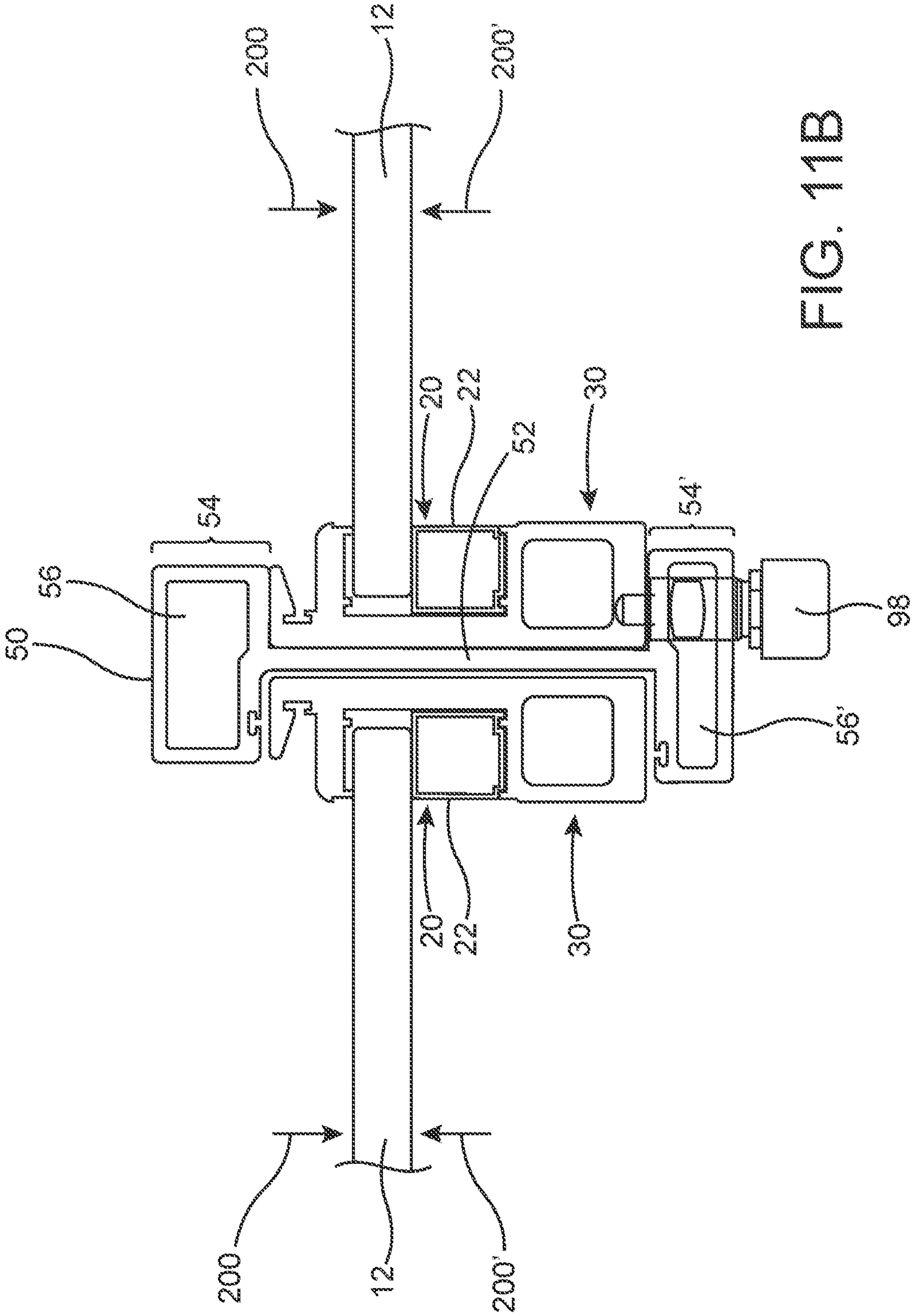
FIG. 11B is a top section view of a one preferred embodiment of a sliding glass door according to the present invention comprising a strengthening member and a plurality of frame handles.
Figure 12:
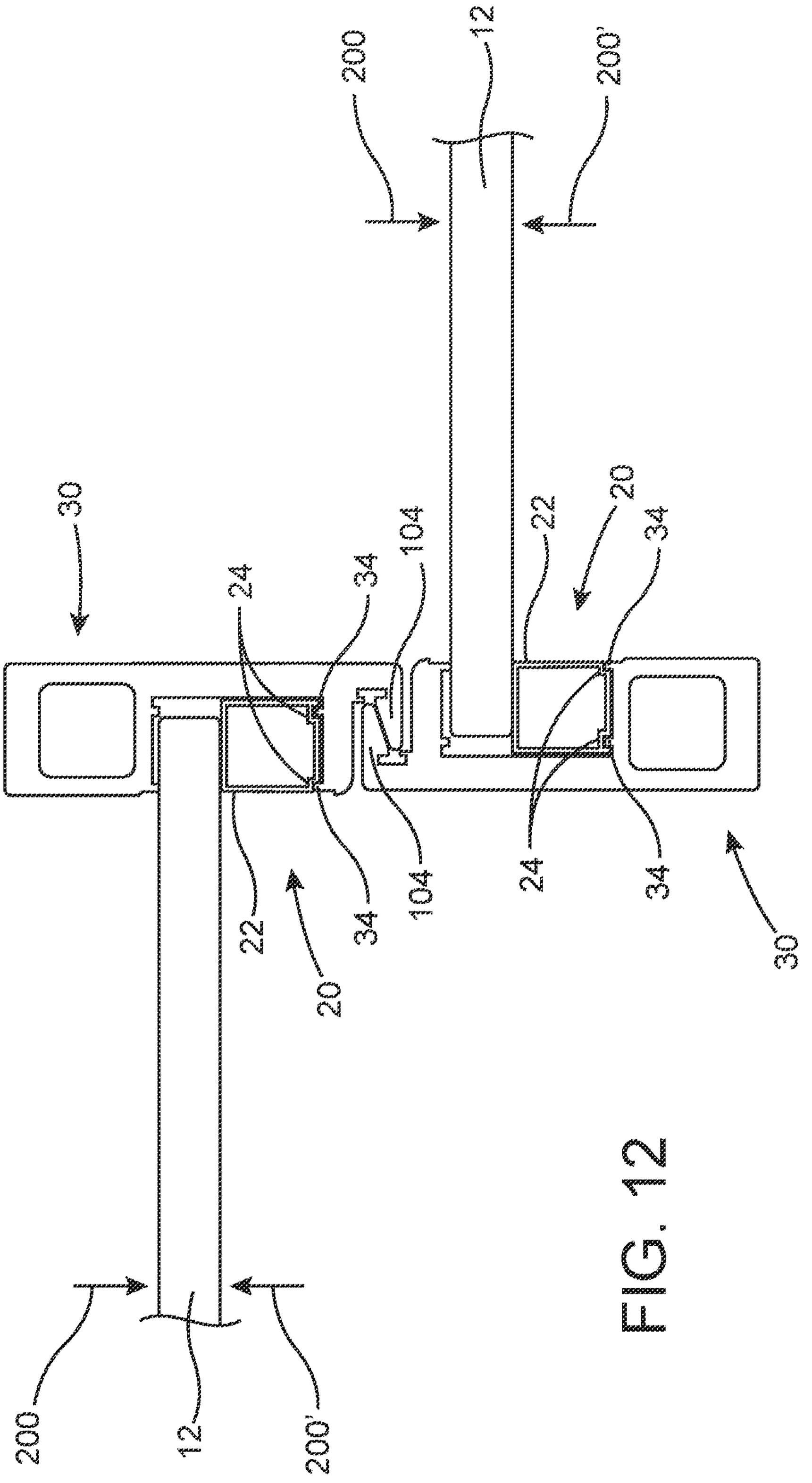
FIG. 12 is a top section view of one preferred embodiment of a sliding glass door according to the present invention comprising two interconnected frames.

Additional structural features of the present invention include a frame handle, generally indicated as 90 in FIG. 11A. The frame handle 90 may include a handle segment 92. The handle segment 92 may comprise a handle surface 94 interconnected to a portion of a support assembly 30. The handle segment 92 may also comprise a handle connector 96 while the support assembly may have a corresponding socket configured for insertion of the handle connector 96. In some embodiments according to the present invention, the handle 90 may be interconnected to the frame 10 by a screw or other type of connector as is the case with the illustrative embodiments as shown in FIGS. 12 and 13. In other embodiments according to the present invention, the handle connector 96 may be removably interconnected to the socket of the support assembly 30. With reference to FIGS. 11A and 11B, the frame assembly 1 comprises two frames 10 disposed in adjacent relation to one another wherein one frame 10 is interconnected to a strengthening member 50, and wherein the other frame 10 is movable relative to the strengthening member 50. In the illustrative embodiments of FIGS. 11A and 11B, the support assemblies 30 and the strengthening member 50 are interconnected through a lock assembly 98. The lock assembly 98 may comprise a bolt or other locking mechanism which may be pushed to lock or release one or more frames 10 from the locking member 50. The illustrative embodiment as shown in FIG. 11A also shows two support assemblies each having a socket for insertion of the handle connector 96 of a handle 90. The illustrative embodiment of FIG. 11A also shows two handles each having a handle connector interconnected to the socket of its corresponding support assembly 30.

Figure 13A:
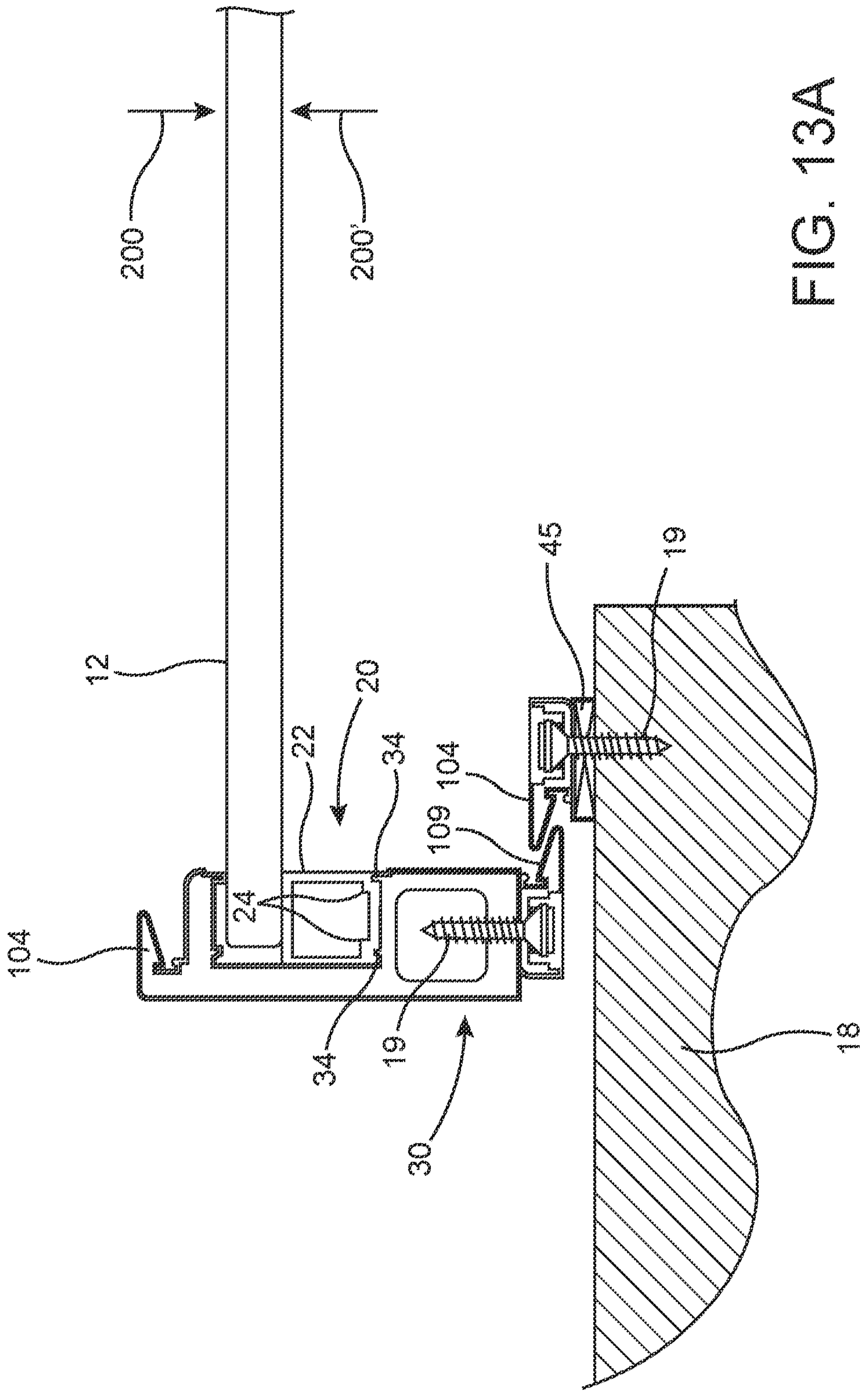
FIG. 13A is a top section view of one preferred embodiment of a sliding glass door according to the present invention comprising an interconnecting member disposed on a support assembly.
Figure 13B:
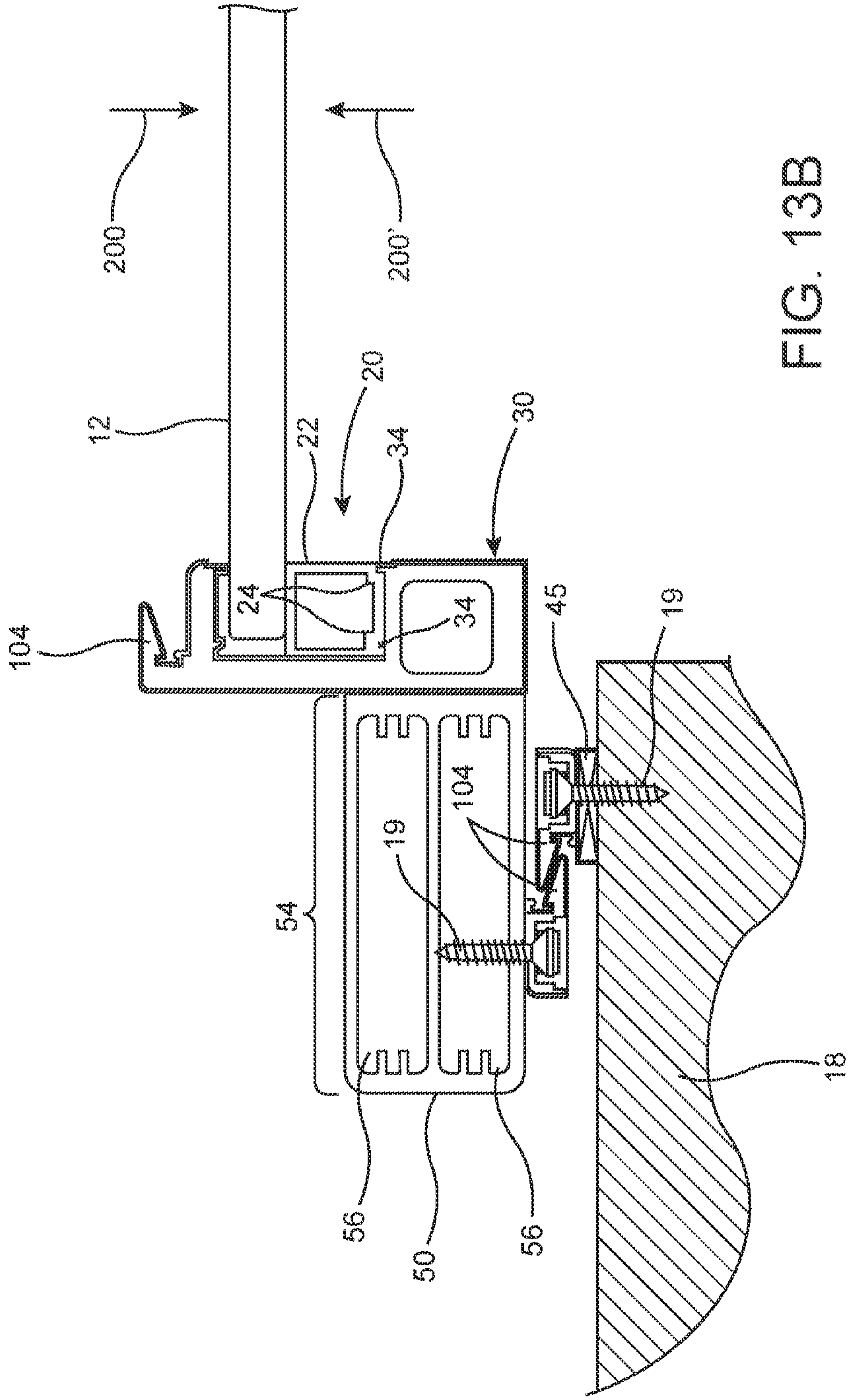
FIG. 13B is a top section view of one preferred embodiment of a sliding glass door according to the present invention comprising an interconnecting member disposed on a strengthening member.

Yet additional features of the frame assembly 1 of the present invention include an interconnecting segment 104 formed on the frame 10. As is shown in FIG. 12, the interconnecting segment 104 may be formed on the support assembly 30 and interconnects two frames 10. The illustrative embodiment of FIG. 12 shows two interconnected frames 10 each one having an interconnecting segment 104 disposed in mating engagement with one another thereby interconnecting the two frames 10. The two frames 10 as shown in FIG. 12 are movable relative to one another. Additionally, the interconnecting segment 104 may be attached the securing surface 18 as is shown in FIG. 13A. FIG. 13A shows a frame 10 having an interconnecting segment 104 attached thereto by a connector 19. In the illustrative embodiment as shown in FIG. 13A, the frame 10 is movable relative to the securing surface 18. Moreover, FIG. 13B shows an illustrative embodiment wherein a frame 10 has an interconnecting segment 104 attached to a strengthening member 50 so that a user may be able to see a portion of the frame 10 when the assembly 1 is fully closed.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A frame assembly for retaining a panel comprising:

a frame comprising a support assembly and a cover assembly interconnected to one another in retaining relation to the panel, said support assembly comprising a predetermined thickness and a predetermined width; said predetermined thickness being of a substantially lesser dimension than said predetermined width, said predetermined thickness of said support assembly disposed in viewable relation to an external, normal line of sight of the panel and being dimensioned to enhance viewing of a greater portion of the panel, at least along said external, normal line of sight, a track assembly comprising at least one track and at least one roller member, said at least one roller member movable relative to said at least one track, said predetermined thickness and said predetermined with of said support assembly being relatively disposed and cooperatively dimensioned to maintain stability of said frame, and at least one expansion chamber disposable between an expanded state and a constricted state concurrent to forces being exerted on said at least one track by said at least one roller member.

2. The frame assembly as recited in claim 1 wherein said cover assembly comprises a cover structure interconnected to said support assembly, said cover structure cooperatively structured with said support assembly to collectively retain the panel on said frame.

3. The frame assembly as recited in claim 2 further comprising a retaining member and a cap segment formed on said cover structure; said retaining member and said cap segment cooperatively disposed to collectively facilitate retention of the panel on said frame.

4. The frame assembly as recited in claim 1 wherein said predetermined thickness of said support assembly is no greater than 1½ inches.

5. The claim assembly as recited in claim 4 wherein said predetermined width of said support assembly is generally between 2 inches and 3 inches.

6. The claim assembly as recited in claim 1 wherein said predetermined with of said support assembly is generally between 2 inches and 3 inches.

7. The claim assembly as recited in claim 1 wherein said cover assembly and said support assembly are interconnected to one another on opposite sides of the panel in collectively retaining relation thereto.

8. The claim assembly as recited in claim 1 further comprising a plurality of sill connectors disposed in spaced relation to one another, each of said plurality of sill connectors structured to surround a portion of a sill cover.

9. The claim assembly as recited in claim 8 including a sill base structured to attach to a securing surface; said plurality of sill connectors formed on said sill base.

10. The claim assembly as recited in claim 9 wherein said plurality of sill connectors are structured to support said at least one track.

11. The claim assembly as recited in claim 1 further comprising a sill assembly including a plurality of sill connectors, said plurality of sill connectors including at least one retaining portion and at least one alignment member, said at least one alignment member disposed on said at least one retaining portion.

12. The claim assembly as recited in claim 1 wherein said at least one expansion member is disposed and structured to expand said at least one track from a resting state, upon a displacement in volume of said at least one expansion member, concurrent to said expanded state thereof.

13. A frame assembly for retaining a panel comprising:

a frame comprising a support assembly and a cover assembly interconnected to one another in retaining relation to the panel, said support assembly comprising a predetermined thickness and a predetermined width; said predetermined thickness being of a substantially lesser dimension then said predetermined width, said predetermined thickness of said support assembly disposed in viewable relation to an external, normal line of sight of the panel and being dimensioned to enhance viewing of a greater portion of the panel, a sill assembly structured to support said frame and including a sill cover, said sill cover including at least one track and at least one roller member, said predetermined thickness and said predetermined with of said support assembly being relatively disposed and cooperatively dimensioned to maintain stability of said frame, and said at least one track including at least one expansion member disposable between an expanded state and a constricted state concurrent to forces being exerted on said at least one track by said at least one roller member.

14. The frame assembly as recited in claim 13 wherein said cover assembly comprises a cover structure interconnected to said support assembly, said cover structure cooperatively structured with said support assembly to collectively retain the panel on said frame.

15. The frame assembly as recited in claim 14 wherein said at least one expansion member is disposed and structured to expand said at least one track from a resting state upon a displacement in volume of said at least one expansion member, concurrent to said expanded state thereof.

16. The frame assembly as recited in claim 14 wherein said at least one expansion chamber is structured to retain at least a portion of said at least one roller member.

17. The frame assembly as recited in claim 14 wherein said expanded state of said at least one expansion member is structured to distribute forces upon said sill cover.

18. The frame assembly as recited in claim 14 wherein said sill assembly includes a sill base and a plurality of sill members; said plurality of sill members structured to support said at least one track.

19. The frame assembly as recited in claim 18 wherein said sill assembly further comprises a plurality of sill connectors including at least one retaining portion and at least one alignment member disposed on said at least one retaining portion.

* * * * *